US011055777B2

(12) United States Patent
Godell et al.

(10) Patent No.: US 11,055,777 B2
(45) Date of Patent: Jul. 6, 2021

(54) IDENTIFIABLE PHYSICAL FORM, SALES INSTRUMENTS, AND INFORMATION MARKETPLACE FOR COMMODITY TRADES

(71) Applicant: Santeri Holdings LLC, Fort Collins, CO (US)

(72) Inventors: Joseph Alexander Godell, Fort Collins, CO (US); Ralph Wayne Godell, Fort Collins, CO (US)

(73) Assignee: SANTERI HOLDINGS LLC, Fort Collins, CO (US)

( * ) Notice: Subject to any disclaimer, the term of this patent is extended or adjusted under 35 U.S.C. 154(b) by 0 days.

(21) Appl. No.: 16/266,704

(22) Filed: Feb. 4, 2019

(65) Prior Publication Data

US 2019/0244291 A1 Aug. 8, 2019

Related U.S. Application Data

(60) Provisional application No. 62/768,136, filed on Nov. 16, 2018, provisional application No. 62/625,514, filed on Feb. 2, 2018.

(30) Foreign Application Priority Data

Nov. 30, 2018 (SG) .......................... 10201810767U

(51) Int. Cl.
*G06Q 30/02* (2012.01)
*G06Q 40/04* (2012.01)
*G06Q 30/06* (2012.01)

(52) U.S. Cl.
CPC ......... *G06Q 40/04* (2013.01); *G06Q 30/0201* (2013.01); *G06Q 30/0605* (2013.01); *G06Q 30/0619* (2013.01)

(58) Field of Classification Search
USPC .......................................................... 705/37
See application file for complete search history.

(56) References Cited

U.S. PATENT DOCUMENTS 7,676,406 B2 * 3/2010 Kinnear ................. G06Q 40/00
705/35
7,853,515 B2 * 12/2010 Harrison, Jr. ...... G06Q 30/0609
705/37

(Continued)

FOREIGN PATENT DOCUMENTS

CN 104851181 A * 8/2015

OTHER PUBLICATIONS

CN-104851181-A (machine translation) (Year: 2015).*

(Continued)

*Primary Examiner* — Narayanswamy Subramanian
*Assistant Examiner* — Paul S Schwarzenberg
(74) *Attorney, Agent, or Firm* — Steven L. Nichols; Fabian VanCott

(57) ABSTRACT

Disclosed herein are systems, methods, and computer program products for communicating a first information node between a seller and a buyer of a production share of verifiable physical goods over a central service layer. A second information node is recorded in the data store covering the verifiable physical goods, wherein the second information node is made by a guarantor in communication with the central service layer. An identifier of the second information node is associated with the first information node over the central service layer. Market information regarding the production share is translated from the first information node and the second information node accessed from the data store using the identifier and integrating the market information regarding the production share into adjusted market information, and the market information regarding the production share and the adjusted market (Continued)

information is transmitted to devices connected over the central service layer.

21 Claims, 13 Drawing Sheets

(56) References Cited

U.S. PATENT DOCUMENTS

| | | | | |
|---|---|---|---|---|
| 8,234,190 | B2* | 7/2012 | Spirgel | G06Q 40/025 |
| | | | | 705/35 |
| 8,750,570 | B2* | 6/2014 | Kerschner | G07D 5/08 |
| | | | | 382/103 |
| 9,640,486 | B2* | 5/2017 | Richter | H01L 23/544 |
| 2002/0138396 | A1* | 9/2002 | Brown | G06Q 40/04 |
| | | | | 705/37 |
| 2003/0033240 | A1* | 2/2003 | Balson | G06Q 10/10 |
| | | | | 705/37 |
| 2009/0327100 | A1 | 12/2009 | Greenberg et al. | |
| 2010/0153297 | A1 | 6/2010 | Haaf et al. | |
| 2013/0144726 | A1 | 6/2013 | Pappas et al. | |
| 2013/0173494 | A1 | 7/2013 | Tayeb et al. | |
| 2013/0191244 | A1 | 7/2013 | Pappas et al. | |
| 2014/0019330 | A1* | 1/2014 | Lerner | G06Q 40/06 |
| | | | | 705/37 |
| 2014/0058905 | A1 | 2/2014 | Kahn et al. | |
| 2015/0120500 | A1* | 4/2015 | Jung | G06Q 30/0609 |
| | | | | 705/26.35 |
| 2019/0253256 | A1* | 8/2019 | Saab | H04L 9/0637 |

OTHER PUBLICATIONS

International Search Report and Written Opinion for PCT/US19/16499 dated Apr. 23, 2019.
Search Report for Singapore Patent Application No. 10201810767U, filed Nov. 30, 2018, 2 pages, dated Jan. 4, 2019.
Written Opinion for Singapore Patent Application No. 10201810767U, filed Nov. 30, 2018, 5 pages, dated Jan. 7, 2019.

* cited by examiner

200 ACE MINING CO.

ABOUT | OPERATIONS | NEWS

| CURRENT OFFERINGS | OFFER SIZE | INSTRUMENT SIZE | INSTRUMENT PRICE |
|---|---|---|---|
| 204 ● Unsecured 3 Month K-Shares | 25,000 | 1.0 oz. | $100 |
| 206 ● Imaginary Ridge Secured 3 Year K-Shares | 400,000 | 1.0 oz. | $300 |
| 208 ● Imaginary Ridge G-Shares | 2,000,000 | 1.0 oz. | 2.0% Rate |
| 210 ● Imaginary Ridge Level 1 C-Shares | 400,000 | 1.0 oz. | $100 |

Live Daily Gold Prices $1,220
$1,215
$1,210
$1,205
$1,200
$1,195

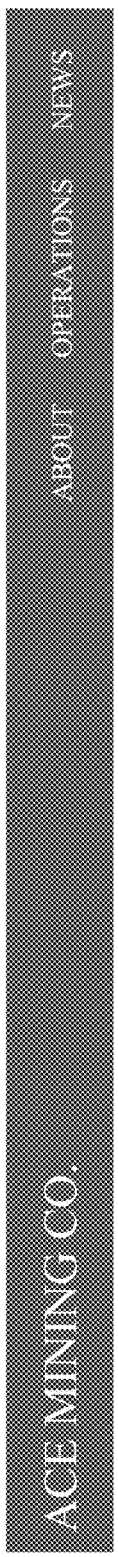
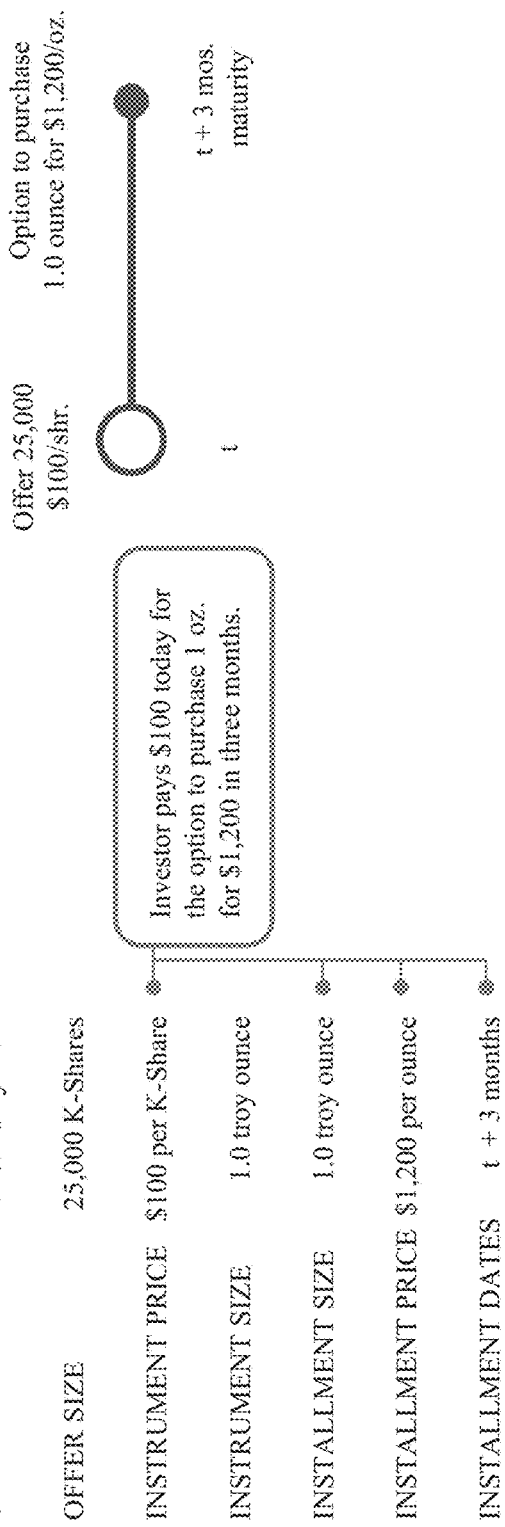
FIG. 3

ACE MINING CO                                                                ABOUT   OPERATIONS   NEWS

Imaginary Ridge 3 Year Level 1 C-Shares

| | |
|---|---|
| OFFER DATE | 01 January 2018 |
| OFFER SIZE | 400,000 C-Shares |
| INSTRUMENT PRICE | $100 per C-Share |
| INSTRUMENT SIZE | 1.0 troy ounce |
| INSTALLMENT SIZE | 0.000125% of quarterly production |
| INSTALLMENT PRICE | $1,000 per ounce |
| INSTALLMENT DATES | Quarterly beginning t+1 year |
| MATURITY DATE | t+3 years |

MineCo diminishes commercial risk and captures another $100 premium

Offer 400,000 $100/shr.

C-Shares offer secondary rights to purchase should K-Share holder with first rights elect not to purchase in any given quarter t    1Q 2Q 3Q 4Q 5Q 6Q 7Q 8Q t+1 year    t+2 year    t+3 year maturity

FIG. 6

IDENTIFIABLE PHYSICAL FORM, SALES INSTRUMENTS, AND INFORMATION MARKETPLACE FOR COMMODITY TRADES

CROSS-REFERENCE TO RELATED APPLICATIONS

This application claims the benefit of U.S. Provisional Patent Application 62/768,136, filed Nov. 16, 2018, entitled "IDENTIFIABLE PHYSICAL FORM, SALES INSTRUMENTS, AND INFORMATION MARKETPLACE FOR COMMODITY TRADES," and the benefit of U.S. Provisional Patent Application 62/625,514, filed Feb. 2, 2018, entitled "INSTRUMENTS AND MARKETPLACE FOR COMMODITY TRADES," which are hereby incorporated by reference in their entirety.

The present application also claims priority under 35 U.S.C. § 119(a) to Singapore Patent Application No. 10201810767U, filed Nov. 30, 2018, entitled "IDENTIFIABLE PHYSICAL FORM, SALES INSTRUMENTS, AND INFORMATION MARKETPLACE FOR COMMODITY TRADES," which is hereby incorporated by reference in its entirety.

BACKGROUND

Mining is the foundation of civilization. No other industry is possible without it. Agriculture, energy, manufacturing, technology, healthcare, construction, and transportation all depend on the mining industry. The world's greatest inventions—the printing press, electricity, the steam engine, telephones, cars, airplanes, vaccinations, semiconductors, computers, the internet, smartphones—all needed metals to change the world, too.

One of the most prominent features of the mining industry is that it requires continuous capital investment, so access to financing and surety of revenue are of primary importance to producers. But these are two big problems for the industry. It is difficult to thrive when the entire ecosystem around miners is designed to extract value at their expense. Capital financing is provided by predators, interest rates are manipulated, miners are price-takers from unfair pricing mechanisms, and commercial sales agreements commit them to taking unknown and unknowable prices.

Take debt financing, for example. A loan is usually arranged through bilateral agreement with a lender where terms of principal, interest rate, and repayment schedule are agreed to. The agreements often include encumbering covenants as well. Alternatively, debt can be securitized and issued by corporations for public investment. While debt financing in either form does provide near-term liquidity, it burdens the company with liabilities of repayment. These liabilities can be amplified in a cyclical commodities industry where there is not a consistent earnings base on which to rely, restricting the company's ability to raise further funds or impairing their ability execute on a strategic agenda Equity is the common financing counterpart to debt. Equity financing raises funds by issuing shares of ownership in the company. These shares grant shareholders a voice of control in several matters of the company, like having the ability to vote in an election of a board of directors. Each equity share also represents a proportional claim on the present value of all future cash flows of the company. This makes the shares subject to dilution, a well-known externality. Whenever more shares are issued in a new financing, the value claim per share is reduced, all else being equal.

As a response to the limitations of these traditional sources of capital, a third form of financing has emerged in the mining industry which is known as a stream financing agreement. In exchange for an upfront payment or series of payments by a streaming company, the mining company commits to sell some portion of future production at a fixed price or at some agreed percentage of the then-current market price to the streaming company. These agreements are often entered before a mine is constructed and act as part of the initial construction financing of the mine. In many cases, the streaming agreement is secured by some or all the mine assets.

A representative stream agreement term sheet may have the following requirements: (1) $400 million in upfront capital payment to the mining company, (2) 25% interest in life of mine gold production for the streaming company, and (3) fixed purchase price of $400 per ounce delivered to the streaming company. In effect, the streaming company itself sits in the position of a mining company but with fixed operating costs. These low fixed costs generate far more robust margins than the mining company, insulating the streaming company from downside price risk. The streaming company also has pure leverage to price upside since there is no risk of margin erosion due to cost inflation. The streaming company can also deploy its capital at its discretion on a project by project basis, without any obligation to do so.

From a mining company's perspective, the primary shortcoming of a traditional streaming deal is that it concedes future profitability and future price upside exposure since it agrees to sell some share of production at a low fixed price. Meanwhile, it retains operational execution, operating cost, capital expenditure, and other risks traditionally experienced in running a mining company.

The sum result is an asymmetric risk-return profile that is skewed in favor of the streaming company. The streaming company's benefit externalities come as a result of the mining company's cost externalities.

After securing financing, the mining company can commence or continue production. To fulfill the obligations of the streaming agreement and execute other commercial sales of their production, precious metal mining companies produce doré or concentrates at the mine, which are then further processed into saleable form. These commercial agreements often contain provisions for the sale of the products at some commodity reference price. By selling in this fashion, the mining company makes a commitment to sell its product at a price that is unknown and unknowable at the time they sign the deal.

The third-party refiner refines the precious metal content into forms that are marketable on gold exchanges. The refined gold can also be sent to a mint for conversion into coins. The third-party refiner can also design and manufacture its own products of varying fineness for sale, through agents or directly, to those who wish to buy them.

From an investor's perspective, purchasing this refined bullion is one of the most secure ways to make an investment in gold. The purchase of physical gold as an investment has its limitations though, as the logistics of delivery and costs of storage can be burdensome.

Often, investors make investment decisions on gold in comparison to a risk-free rate of return. Currently, the two instruments which are generally considered benchmarks for risk-free interest rates are three-month U.S. Treasury bills and the London interbank offer rate, known as LIBOR. However, considering that at approximately $20 trillion the U.S. national debt exceeds its GDP, and that six banks have agreed to pay a combined $5.8 billion in fines with five of them pleading guilty to criminal charges for manipulating the LIBOR, these benchmarks are not without risk.

Exploitation has seemingly reached other gold investment vehicles, too. Gold Exchange Traded Funds (ETFs) are listed on traditional stock exchanges, purportedly making gold investment easier. These ETFs are often structured as Unit Trusts, where the Trust owns the gold, and investors purchasing the ETF own shares in the Trust, not the underlying physical gold. This discrepancy in ownership opens the door to a problem: The Trust not fulfilling its obligation to purchase gold to match purchases of the ETF shares by investors. The U.S. Securities and Exchange Commission has published evidence submitted by market researchers showing the largest gold ETF failed to make adequate physical gold purchases over a two-year period when approximately $1.7 trillion worth of ETF shares traded.

Another way investors can gain exposure to movements in gold price is by making investments in the equity shares of either mining companies or streaming companies. This comes with other risk exposures across the company's portfolio of assets, including cost inflation, execution risk, geographic and political risk. They also entrust company management to make prudent decisions of their behalf.

As for product pricing, commercial sales agreements for gold mining companies largely reference two mechanisms, a futures price and a spot price. A gold futures contract is an agreement to purchase gold at a future date for a predetermined price. Futures contracts can also be bought and sold through derivative options contracts, where the holder of the option has the right to exercise the underlying futures contract, but not the obligation. In fact, delivery of physical product in futures transactions is rare as a cash payment can be made in lieu of delivery.

The largest gold futures market is the Commodity Exchange (COMEX) operated by the CME Group, where over 70 million contracts representing over 220,000 metric tonnes of gold were traded in 2017. For perspective, all gold mined in the duration of world history is estimated near 195,000 metric tonnes. Of the 220,000 metric tonnes of COMEX gold contracts traded in 2017, only about 100 metric tonnes worth of physical gold was delivered—a delivery rate of 0.046%.

As a result, at any given point in time, the contracts outstanding represent more physical gold than exists to honor those contracts. On the 8 Nov. 2017, the CME Group published registered gold stocks of 553,576.101 troy ounces of gold. On that same reporting date, the contracts being held represented 53,278,300 troy ounces. There were nearly 100 claims of ownership through contracts for each physical troy ounce of gold the CME Group held in registered inventory. Because of the possibility of cash settlement, there is no firm restriction on the creation of new derivative contracts, potentially resulting in a departure in price of the contract from the true price of the underlying asset.

Unknown price deviations could be exacerbated in the London over-the-counter (OTC) market where parties trade bilaterally. These trades are conducted off-exchange, so no true data on the size, frequency, or price of these transactions is reported. The World Gold Council estimates that the London OTC market is around 8 times larger than the COMEX market, with up to $235 billion of notional gold contract value changing hands each day. That transaction value implies nearly 1.8 times total annual global mine production is traded bilaterally each day, or over 1,400,000 metrics tonnes annually, yet none of that trade data is being captured in an organized fashion.

The other predominant pricing mechanism for gold sales is the spot price published by the London Bullion Market Association (LBMA). The process is described as an auction where a group of LBMA members agree on the gold price twice per day. This group is currently comprised of 14 accredited participants, with minimum required participation of only three members each day. With such limited participation, this pricing mechanism is not transparent nor reflective of the broader market, and without access to a broad customer base to sell their product on their own terms, mining companies are subject to being price-takers from this small cohort of banks.

The importance of these reference price mechanisms is immense. Since gold is indestructible, not only do current mechanisms set prices for new production, they also price the near 195,000 metric tonnes of physical gold ever mined, along with all futures contracts, mining equities, derivatives, and foreign exchange derivatives which are marked-to-market based on these reference prices.

In order to ensure the long-term survivability of mining companies and future production of gold and other metals, which are essential to our civilization, it is critical that commodity prices be determined by market forces in an honest and transparent way. What is therefore needed is an entirely new system for the capital financing, pricing, and commercial sale of physical commodities.

BRIEF DESCRIPTION OF THE DRAWINGS

The accompanying drawings are incorporated herein and form a part of the specification.

FIG. 2 illustrates a participant interface to access the electronic platform, in accordance with an embodiment.

FIG. 3 is an additional view of the platform interface, in accordance with an embodiment.

FIG. 6 is an additional view of the platform interface, in accordance with an embodiment.

In the drawings, like reference numbers generally indicate identical or similar elements. Additionally, generally, the left-most digit(s) of a reference number identifies the drawing in which the reference number first appears.

DETAILED DESCRIPTION

Provided herein are techniques for creating a form of physical product, such as gold doré or gold ingot, with a unique and inherently immutable physical identification pattern that is digitally scanned, mapped, and stored on an electronic platform, making the product verifiable as to its origin and use in commercial transactions.

Additionally, system, apparatus, device, method and/or computer program product embodiments, and/or combinations and sub-combinations thereof, for instruments and a proprietary marketplace for commodity trades are provided that serve as a mechanism for capital financing and product sales. Embodiments disclosed herein detail how the interplay of these instruments creates new information that can be captured, derived, and transmitted by way of a computer-implemented electronic platform. The specification of physical form of product and corresponding sales instruments create an approach for trading physical commodities in a marketplace that cannot be manipulated.

The result is an approach for more accurately and fairly valuing the underlying physical commodities, while the implications of the information created by the instruments are far reaching, carrying beyond the immediate proprietary marketplace and into other major established markets such as commodity trading markets, interbank lending markets, mortgage markets, and currency trading markets.

(i) IDENTIFIABLE FORM OF PHYSICAL PRODUCT

The foundation of a fair system for the commercial sales of commodities is a form of product that is identifiable and verifiable, from origin through each stage in the commercial supply chain, to end purchaser.

In an embodiment, the product is an ingot containing gold, made by pouring melted gold-bearing material into a mold, which can be in any number of shapes. While the ingot is cooling but still in liquid form, one or more nozzles manufactured of stainless steel with a melting temperature of 1510 degrees C. or other metal or alloy of metals with a melting temperature above the melting temperature of gold (1063 degrees C.) are inserted into the gold melt. The nozzles are connected to a source of gas, such as air, nitrogen, argon, xenon or other gas that is non-reactive with gold. The gas is injected at minimum of 5 pounds per square inch (PSI) with pressure increasing until bubbles in the melt are created. The gas can be injected steadily or in one or more bursts and with the angle of one or more nozzles being varied. In an embodiment, some or all the gas is composed of air.

Figure 13:
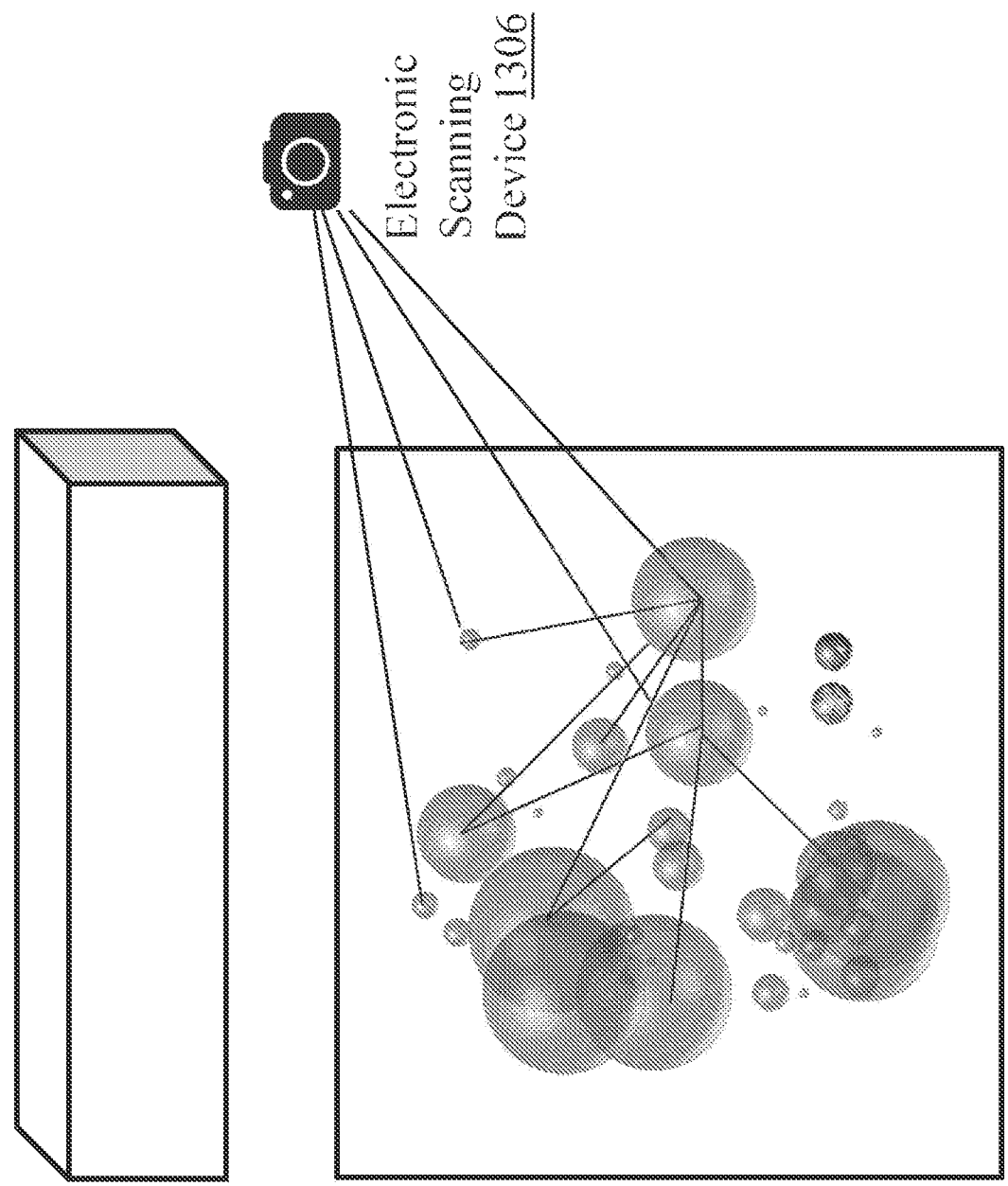
FIG. 13 illustrates views of an exemplary gold ingot marked with a unique pattern, in accordance with an embodiment.

The object of this injection is to create a physical pattern that is unique to each ingot (e.g., gold doré, refined gold bar, or any other physical form of gold-bearing product). In one embodiment, this physical pattern is a series of bubbles. The unique pattern is contained within the ingot and is not visible externally. Once the ingot cools and solidifies, the ingot is cleaned and stamped with the producer's or refiner's name, serial number of the ingot, mass of the ingot, purity and any other information the creator desires to include. The ingot is then viewed with X-ray, ultrasound, or other non-invasive methods, and the physical pattern is recorded, with individual pattern shape features, dimensions, and relative locations being measured to a degree beyond discernible to the human eye. In accordance with an embodiment, information about the ingot is associated or otherwise encoded with the unique internal pattern as metadata, creating an identifiable and verifiable physical product. FIG. 13 illustrates views of an exemplary gold ingot marked with a unique pattern, in accordance with an embodiment. Externally, this physical identifying information is not visible on the ingot, as shown in external view 1302. Internally, as shown in view 1304, a unique bubble pattern may be scanned and identified through the use of electronic scanning device 1306, in accordance with an embodiment.

One skilled in the relevant art will appreciate that the characteristics of the ingot provided above, such as producer's name, serial number, mass, and purity, are provided by way of non-limiting example and there could be any amount of information recorded about the ingot. Similarly, additional characteristics of the internal pattern could be measured, in accordance with an embodiment, and the process could be performed or repeated at the mine source, at a refinery, or in the casting or recasting of any product.

The creation of immutable physical characteristics within a product, such as a gold ingot, allows for the association of the physical unit with a verifiable electronic record of title by matching the internal pattern to the serial number and other characteristics of the ingot, which can then be electronically tracked for the duration of its existence without compromising the fungibility of the production unit. Authentication can be made quickly by using the same non-invasive method and comparing the internal pattern with the pattern on record along with the other characteristics of the ingot. This reduces administrative and handling costs by obviating the need to recast an ingot or authenticate the gold by other means.

Figure 10:
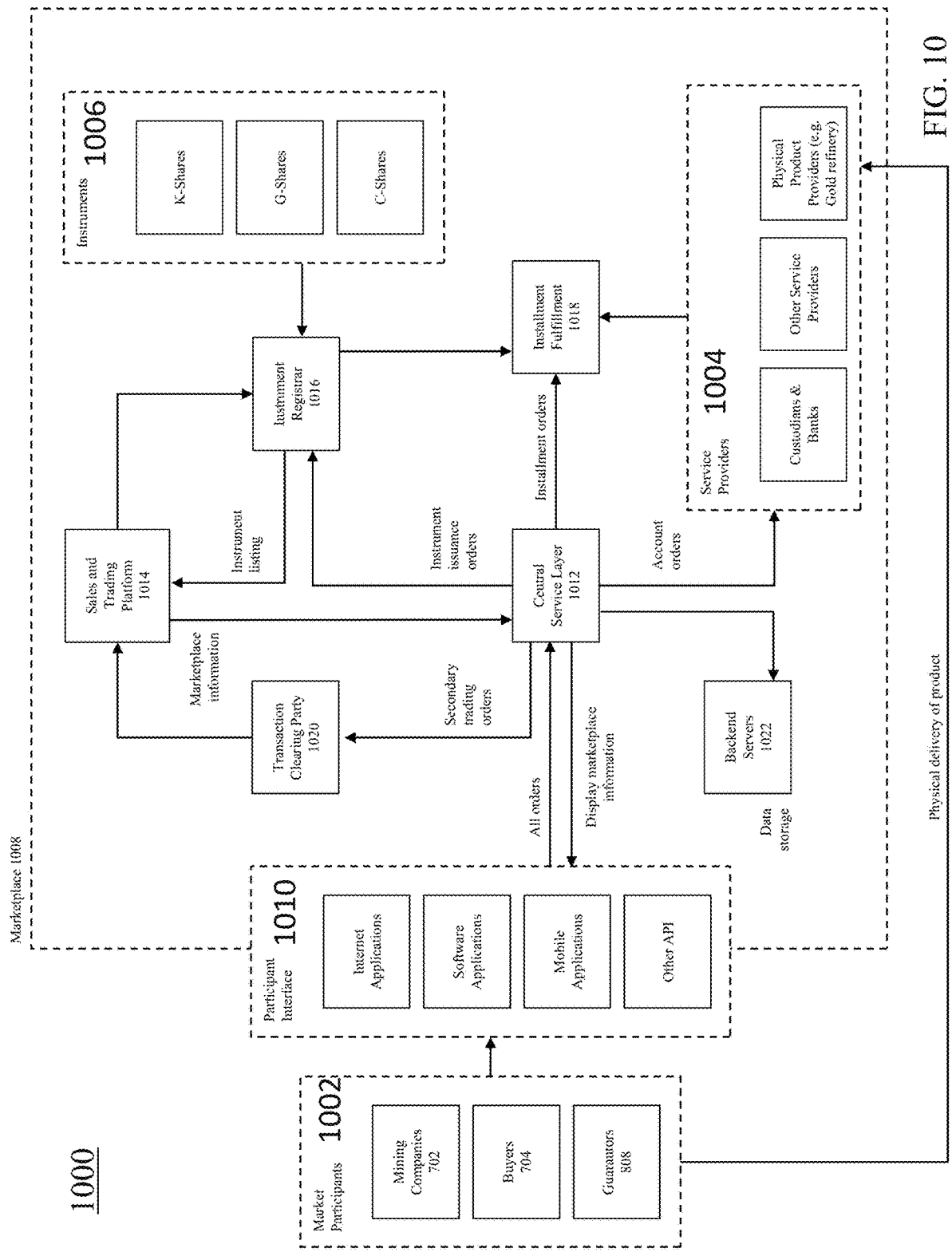
FIG. 10 illustrates an implementation of a K-share, G-share, and C-share marketplace, in accordance with an embodiment.

In accordance with an embodiment, this electronic record of ownership could be maintained by a proprietary electronic platform, as illustrated in FIG. 10. The platform 1000 serves to coordinate all market participants 1002 and service providers 1004, with information being stored on data servers 1022.

In accordance with another embodiment, as physical product is initiated onto the electronic platform 1000 for use in transactions, the internal pattern information and ingot metadata could be stored using a distributed network of individual data servers which verify the record of provenance using blockchain technology. When the physical product enters the platform, it can be tracked on a blockchain corresponding to a contract (e.g., K, C, or G shares, discussed below). The electronic platform would then coordinate the commercial sale of the physical product. Upon delivery of the physical product to a buyer, maturity of the contract, or other end condition, the bubble pattern information and associated ingot metadata would be deleted from the blockchain. This enables increased speed and cost efficiency in the transaction verification process as the blockchain does not continually grow like traditional deployments of blockchain technology.

The association of verifiable physical characteristics that can be tracked electronically can be utilized for purposes of identification of product in bailment and secured transaction laws. It can also provide a means of audit which precludes the reliance of trust in the custodian holding the underlying asset and can also protect against the creation of derivative contracts in commercial transactions which are unregistered with a specific unit of product.

(ii) INFORMATION MARKETPLACE: SALES AND TRADING INSTRUMENTS

Figure 11:
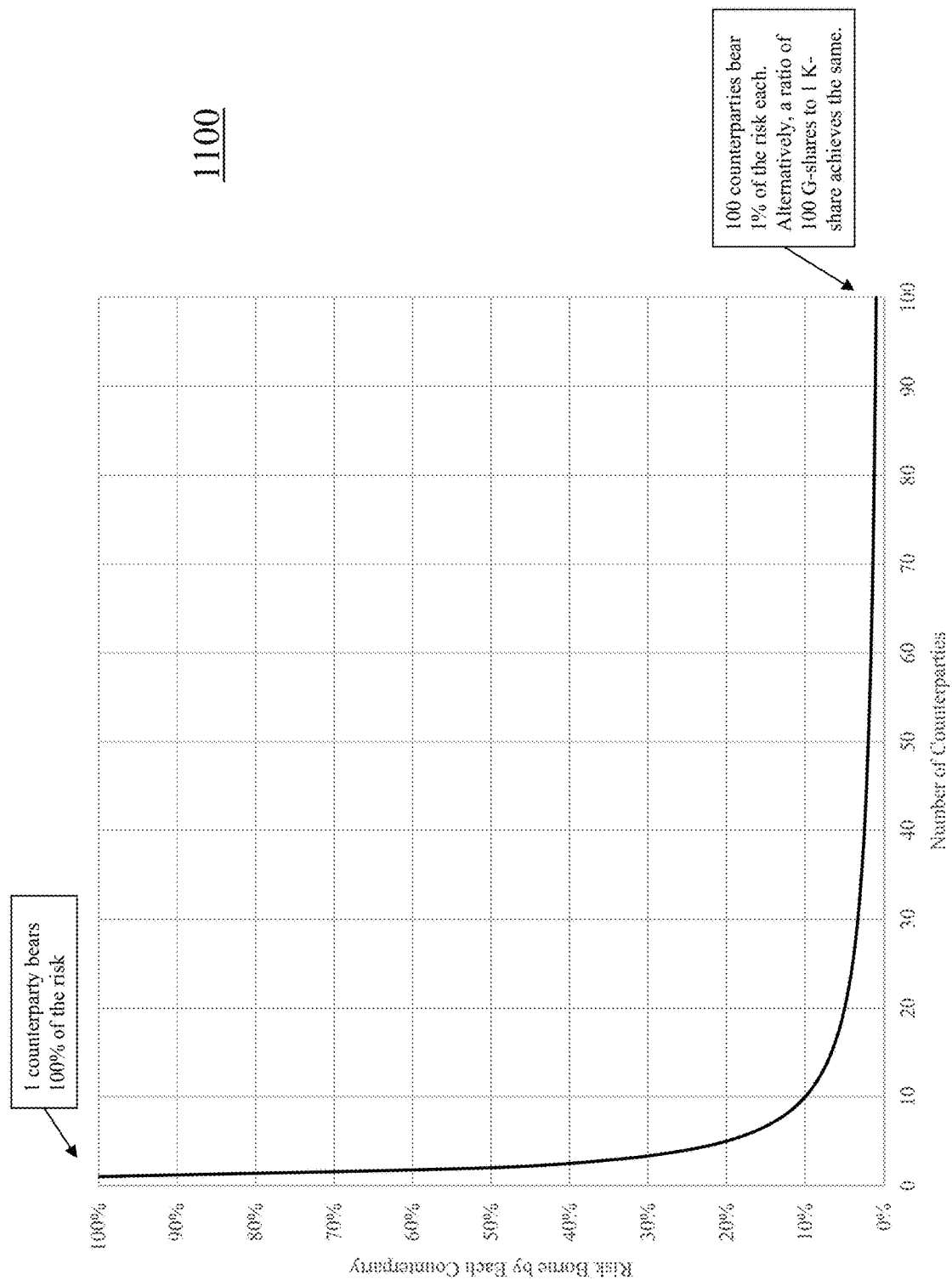
FIG. 11 is an exemplary chart illustrating how an increase in the number of counterparties reduces the risk borne by each counterparty, in accordance with an embodiment.

For mining companies selling their product, the problem of restoring more equitable risk and profit sharing lies in the distribution of risk across a pool or pools of counterparties rather than dealing with a single counterparty. FIG. 11 is an exemplary chart 1100 illustrating how this increase in the number of counterparties reduces the risk borne by each counterparty, in view of the instruments discussed in detail below.

Figure 1:
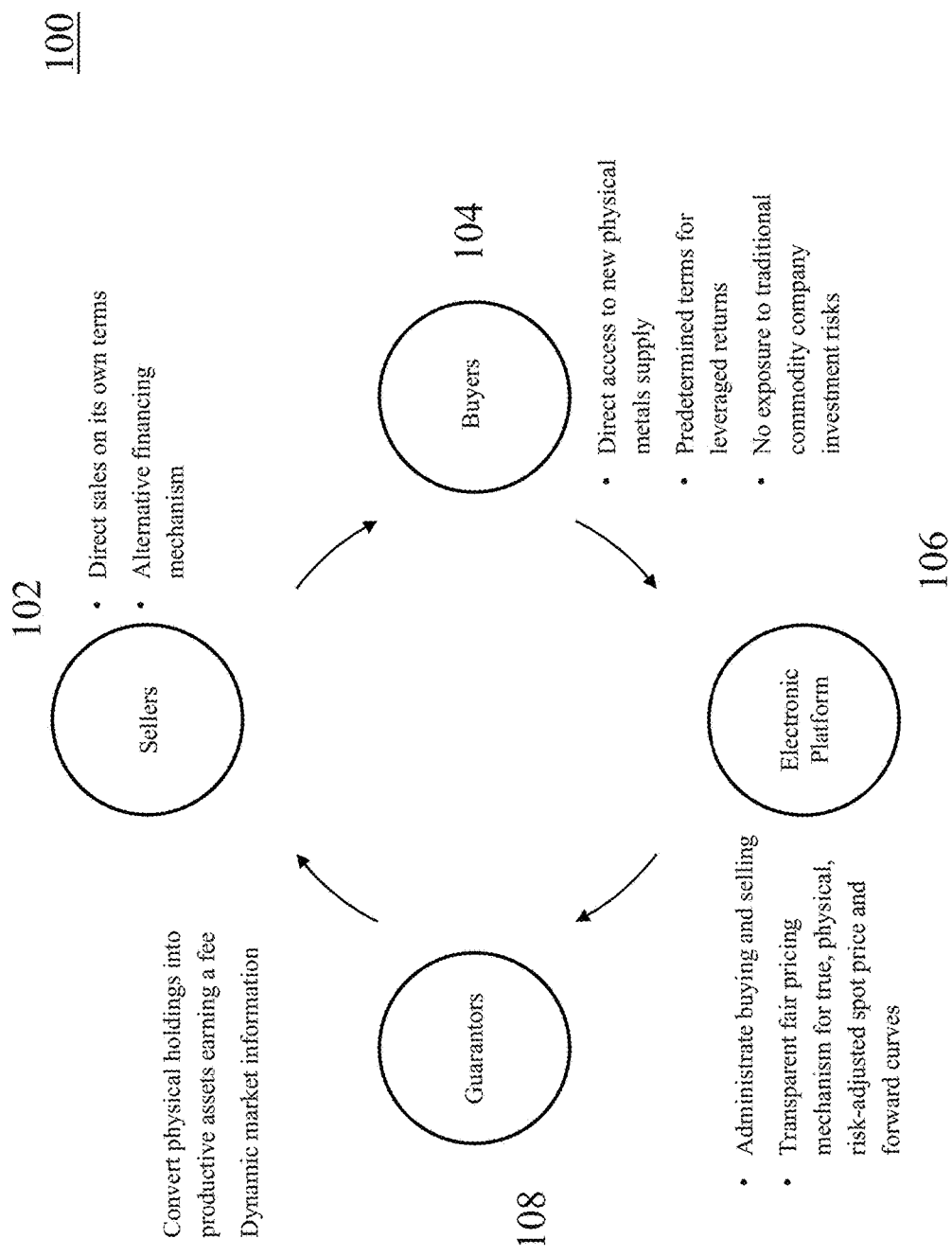
FIG. 1 is a diagram illustrating interactions between participants in a marketplace in accordance with an embodiment.

FIG. 1 is a diagram illustrating interactions between participants in proprietary marketplace 100 in accordance with an embodiment. Rather than selling rights to a streaming company, marketplace 100 allows a mining company 102 to control its terms by utilizing new kinds of instruments to sell its products to buyers 104. The instruments can be bought, sold, or traded by buyers in the marketplace as coordinated by electronic platform 106 as with many other instruments. Guarantors 108 can pledge existing holdings as guarantee of performance of the instruments, in accordance with the terms of the instruments.

The instruments sold and traded in proprietary marketplace 100 provide buyers with purchase rights to physical product, such as precious metals in an identifiable and verifiable physical form, directly from the producer, such as mining company 102, without exposure to the traditional risks of an equity investment in a mining company. The instruments provide the means for mining company 102 to realize a favorable price for its product by selling directly to a buyer 104 instead of through intermediaries. The instruments further allow them to sell in smaller quantities, thereby making the product affordable to more buyers 104, increasing access to a broader audience of customers.

The resulting implications for mining company 102 are not limited to stream financing. Debt with encumbering covenants no longer must be accepted, dilutive equity no longer must be sold, and reference prices to cash-settled derivative products no longer must be taken, thereby providing a more refined mechanism for capital financing and fair product pricing.

The instruments by which physical product is transacted effectively serve as nodes in a network by which parties are connected and through which information is created and exchanged. FIG. 2 illustrates platform interface 200 which provides access to the electronic platform, in accordance with an embodiment. This interface 200 displays offerings for an exemplary mining company 202, in accordance with embodiments discussed in further detail below. As a non-limiting example, from this interface 200 a user could participate in four current exemplary offerings: unsecured 3-month K-shares 204, secured 3-year K-shares 206, G-shares 208, and C-shares 210. Interface 200 also includes a real-time chart 212 of current gold pricing. Trading of those instruments in the proprietary marketplace and coordinated by the electronic platform, enables a transparent and efficient process for creating risk pricing and product pricing information, which has traditionally been elusive for precious metals, particularly with respect to gold. By way of non-limiting example, market information as described herein includes information such as prices, transaction volumes, interest rates, risk premiums, quantities available for purchase, and other such market data.

Although interface 200 is provided by way of non-limiting example, a person of ordinary skill in the art would appreciate that a similar electronic platform may be used to connect buyers directly with the exemplary mining company 202 in order to purchase its offerings, such as offerings 204, 206, 208, and 210. Separately, and as discussed further below, information regarding the pricing and sales of offerings 204, 206, 208, and 210 can allow interface 200 to provide accurate gold pricing data for display in real-time chart 212.

As before, one skilled in the relevant art will appreciate that the electronic platform may permit offerings by other types of producers and is not limited to mining companies such as exemplary mining company 202, and the techniques, methodologies, systems, and other disclosures included herein are directly applicable to other producers of physical products. Similarly, one skilled in the relevant art will appreciate that discussion herein of gold as the specific physical product is provided by way of example, and not limitation, and that the approach is similarly applicable to other precious metals, and to many other commodities generally.

(iii) STRUCTURE OF SALES INSTRUMENTS

Instead of foregoing significant revenues over the life of a mine, mining company 102, or a third party, can sell product using a tradable sales instrument that restores pricing power to the seller. This provides a mechanism for maximizing value per unit sold by eliminating the intermediary streaming company or other value-extractive intermediaries, in accordance with an embodiment.

The administrative requirements of issuing and recording transactions of the sales instruments in the proprietary marketplace, which are substantiated by physical product, are managed by means of a computer system and communication network. As illustrated in FIG. 2, a producer, such as exemplary mining company 202, may offer K-shares in accordance with an embodiment.

A K-share is a tradable sales instrument that offers a producer access to capital on-demand through public offerings of either an interest in production or given quantities of current and future production at predetermined payment and delivery terms. The producer selling the K-shares can indicate the initial purchase price of the sales instrument as well as the future purchase price for which it sells some unit of production. The offering is made available to participants in the proprietary marketplace who are free to accept or ignore the offer.

A K-share is not subject to share dilution as it does not represent ownership in the mining company, but rather grants exclusive rights to purchase physical product. Because the instrument is deliverable by physical product, it provides buyers a means to secure rights to physical product for a definite time without the mandate to take delivery, as buyers are free to sell the instrument to secondary participants in the marketplace prior to the instrument maturity, in accordance with an embodiment.

The effect is a single instrument in which the decision to buy and sell the instrument is separated from the decision to purchase the underlying physical product. Because buyers can purchase the instrument without providing the full cash outlay for the underlying physical product upfront, their initial purchasing power is leveraged, while the predetermined purchase terms for physical product create leverage with respect to price movements of the underlying asset over time.

FIG. 3 is an additional view of platform interface 200, in accordance with an embodiment. In this view, the terms of a K-share offering by exemplary mining company 202 are detailed, in accordance with an embodiment. In the case of the exemplary K-share depicted as 304, the offering is for an unsecured 3-month K-share, although one skilled in the art will appreciate that the terms of any particular offering may vary.

A K-share offering includes, in accordance with an embodiment, the following terms:

Instrument Quantity: The volume of product (e.g., precious metals) committed to each K-share by the seller. In accordance with various embodiments, the volume is provided as a percent interest in production or as an absolute quantity of product. The increments by which the buyer will have the option to purchase the product is also provided, in which case the instrument quantity is equal to the sum of the increments.

Purchase and Delivery Dates: The dates, or series of dates in an installment schedule, at which the buyer can purchase, and seller deliver, the increments of product defined in the contract. This allows for a series of option decisions for the holder embedded within a single instrument. In an embodiment, should the buyer elect to not to purchase on a given installment date, the issuing company will have no obligation to deliver precious metals and the date will pass without transaction. Delivery could be either to direct possession or to a third party, such as a vaulting or custodial service provider, or, upon direction from the buyer, to another instrument provided by the proprietary marketplace.

Installment Price: The price the buyer is to pay upon delivery of product should the buyer purchase on a given installment date. In the preferred embodiment, this price shall be named upon the offering and this transaction shall only be settled by physical delivery of product to the buyer or third party acting on its behalf, though other embodiments could include other forms of settlement, for example cash settlement. In one embodiment, the installment purchase price could reference an agreed-to market reference price or include reference to an index for items such as inflation in cost of production or currency inflation, thereby distributing these risks between seller and buyer. In accordance with an embodiment, the installment purchase price could be made in any fiat currency, paid in-kind, or paid in any other object of value, with the specification made as a measure of that object, for example a determined mass or volume. In the embodiment where some object of value is paid for the installment, the tradable sales instruments could be used as compensation in commercial transactions, bypassing exposure to traditional fiat currency risks.

Installment Exercise Type: Term denoting whether the holder of the instrument has the right or the obligation to purchase on a given installment date, in accordance with various embodiments.

Maturity Date: The date at which the K-share extinguishes in full, specified as either a date when all installment dates have passed or when a specified trigger condition (e.g., mineral resources subject to the instrument have been exhausted) has been met. In accordance with an embodiment, other provisions may cause the instrument to expire prior to its stated maturity date, such as nonpayment of an installment.

Instrument Price: The price paid to acquire the K-share upon issuance. In accordance with an embodiment, the instrument price could be paid in any fiat currency, paid in-kind, or paid in any other object of value, with the specification made as a measure of that object, for example a determined mass or volume.

One skilled in the relevant art will appreciate that while these are the basic terms needed to create a fully-scoped K-share, other terms or variations of these terms may be used in order to provide a similarly complete offering. For example, terms could be provided as to the delivery point for the product or which party pays for refining, recasting, storage, insurance, security, and other costs.

Returning to FIG. 3, exemplary unsecured 3-month K-share 304 specifies that the buyer has the exclusive right to purchase 1.0 ounce of gold for $1,200 in three months' time. The buyer pays $100 for the K-share. Timeline 306 shows this two-stage process: at time 't' each share is offered for sale at $100 per share, and at time 't' plus 3 months, each buyer holding a share has an option to purchase 1.0 ounce of gold for $1,200.

Figure 4:
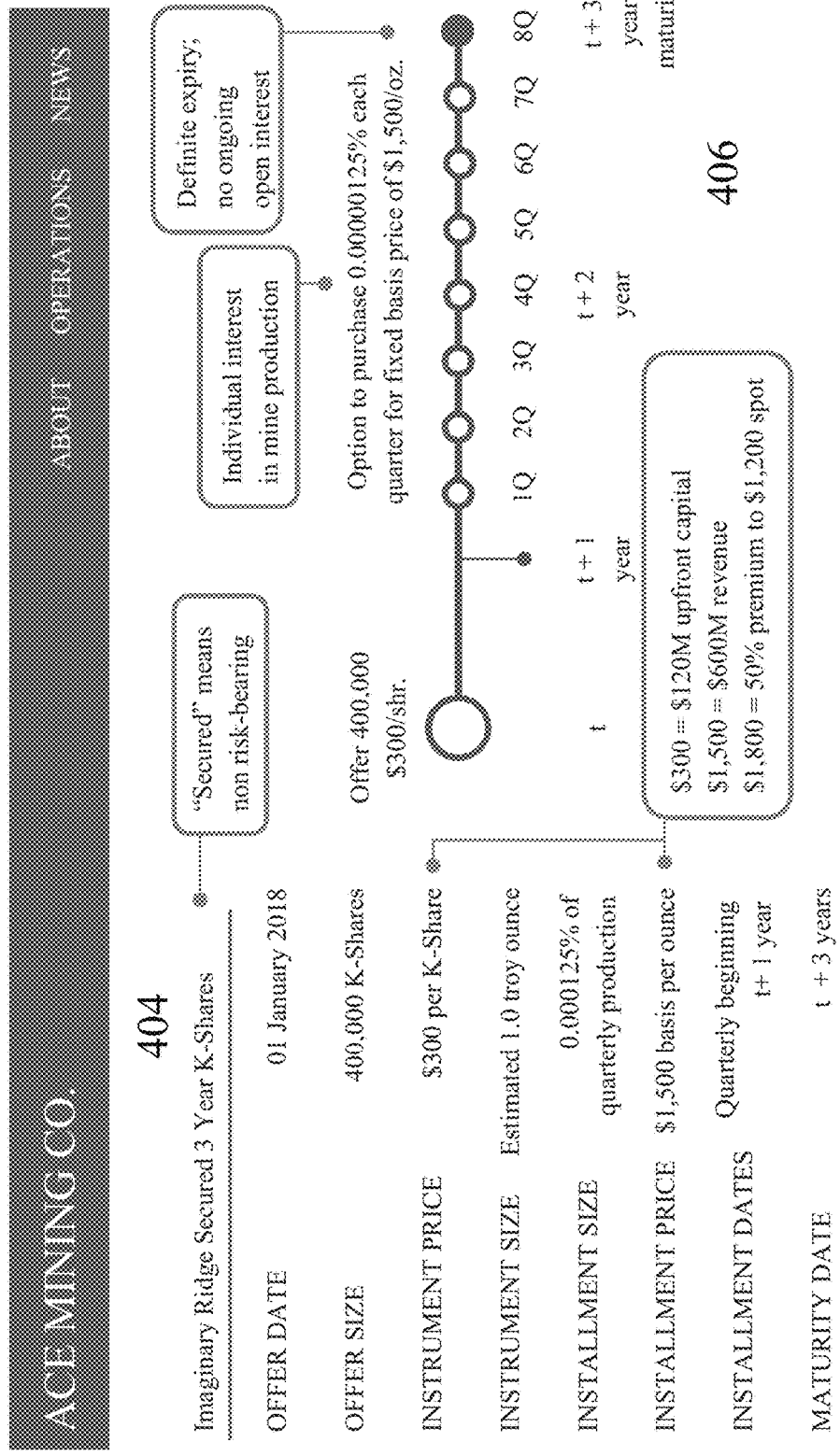
FIG. 4 is an additional view of the platform interface, in accordance with an embodiment.

FIG. 4 is an additional view of platform interface 200, in accordance with an embodiment. In this view, the terms of an additional K-share offering by exemplary mining company 202 are detailed, in accordance with an embodiment. In the case of the exemplary K-share depicted as 404, the offering is for a secured 3-month K-share, although one skilled in the art will appreciate that the terms of any particular offering may vary.

In this example, K-share 404 may be issued in accordance with the following terms:

Each K-share entitles its owner with the exclusive right, but not obligation, to purchase 0.000125% of quarterly gold production from the Issuing Company on each installment date. Purchase and delivery will be made in eight equal quarterly installments beginning one year from the date of issuance. The K-share holder is to pay a fixed price of $1,500 per ounce at the time of delivery, should the holder elect to purchase. The share will mature three years from the date of issuance once all 8 installment dates have passed.

In this example, the instrument quantity is defined as a percent interest in the quarterly production of gold from the Issuing Company mine. With expected quarterly production of 100,000 ounces, the Issuing Company will designate 200,000 ounces of gold per year to the offering, or 50% of expected annual production, resulting in a total offer of 400,000 K-shares. Each K-share will be offered for $300. Assuming all instruments are purchased, the Issuing Company will receive $120 million in permanent initial capitalization from the K-share sale and $600 million in expected revenue from ongoing installment purchases.

The K-share sale process can be freely iterated, creating new sales orders day-by-day, allowing producers to sell controlled tranches of production while generating a continuum of offering dates, installment dates, and maturity dates in accordance with the company's needs and capacities. The nature of these sales instruments negates any perverse incentives to trade around a certain date, resulting in a fair representation of the underlying product price. This contrasts with existing futures and options markets which have infrequent settlement and expiration dates, are not consummated by physical delivery, and are not sold by producers—all features which may distort a true and fair market price.

Further, the sale of K-shares is a 100% agreement transaction. Buyers are free to accept or ignore the terms offered by the mining company. Should a buyer accept, it indicates its agreement to the pricing terms. This results in price certainty for all parties involved. Producers are freed from being price-takers and there is no reference to a market price which is unknown and unknowable at the initial date of transaction.

In an embodiment, all participants first register with the electronic platform for identity verification, clearing jurisdictional hurdles provided by law including those governed by regulators. These protocols ensure legitimacy of transactions.

Once registered with the electronic platform, a producer of physical product can initiate a transaction. For example, mining company 202 enters the terms of its desired K-share offering into the electronic platform through the participant interface. The terms of sale are routed to a central service layer which is configured to manage and display all offers for sale on the participant interface. Buyers can either accept or ignore the terms offered, and if they accept, submit a request to purchase a specified number of instruments. In certain embodiments, this interface could be accessed through a website, computer software application, smartphone application or other electronic means of communication, including light transmission, for example fiber optic cables, and infrared devices. In other embodiments, transactions could be facilitated by in-person communications in physical business offices.

In another embodiment, the mining company could submit an objective, such as a total number of instruments it desires to be sold or a total capital figure to be raised, and the central service layer could be configured to iterate the terms of sale automatically until the objective is achieved. In another embodiment, the initial price of the share could be a dependent variable calculated by means of algorithm based on the other terms of the offering.

When a buyer accepts the terms offered, the central service layer can be configured to automatically issue the K-shares by generating an electronic record of the K-shares and registering them with the owner accounts and noting the order of sequence, in accordance with an embodiment. Successful administration of this procedure would be infeasible without use of a computer system and communication network.

In accordance with an embodiment, when the K-shares instruments are generated by the central service layer for issuance and registration, a unique individual identifier key is also generated and assigned to each K-share, which could be comprised of letters, numbers, or symbols. Upon a given installment date, should buyers holding K-shares elect to purchase physical product from the producing mining company, the individual identifier key will be associated with the physical pattern contained within the physical product and other ingot characteristics, and record of title transfer sent to the central service layer for storage on a data server. This allows for the verifiable tracking of physical product from its genesis, down to the specific mine site, and retains a record of transfer to its owner. In an additional embodiment, upon installment purchase of a K-share, the individual identifier key can be stamped on the exterior of the physical metal product.

The unique identifier key also serves to prohibit the creation of derivative financial instruments within the electronic platform since each unique identifier key must be substantiated by assigned physical product, in accordance with an embodiment. This ensures no situation of rehypothecation can be encountered where a given quantity of production is assigned to multiple K-shares.

In accordance with an embodiment, after initial sale, the central service layer registers the K-shares on a sales and trading platform where they are available for secondary trading in the proprietary marketplace. The holder of a K-share can offer their share for sale in the same manner as the initial seller, setting the terms of the sale and making it available to buyers who are free to accept or ignore the offer, in accordance with an embodiment. It should be noted that the obligation to deliver remains with the producer who initially sold the K-share regardless of how many times the K-share is resold in the secondary marketplace, in accordance with an embodiment. In another embodiment, a nonproducer could initiate a primary sale of K-shares following the same protocol.

In the case of secondary trading in the marketplace, the central service layer can be configured to automatically extinguish a given individual identifier key and replace it with a new individual identifier key upon transfer of the K-share, in accordance with an embodiment. This ensures only the then-current holder of the share has knowledge of that key, in accordance with an embodiment.

Figure 7:
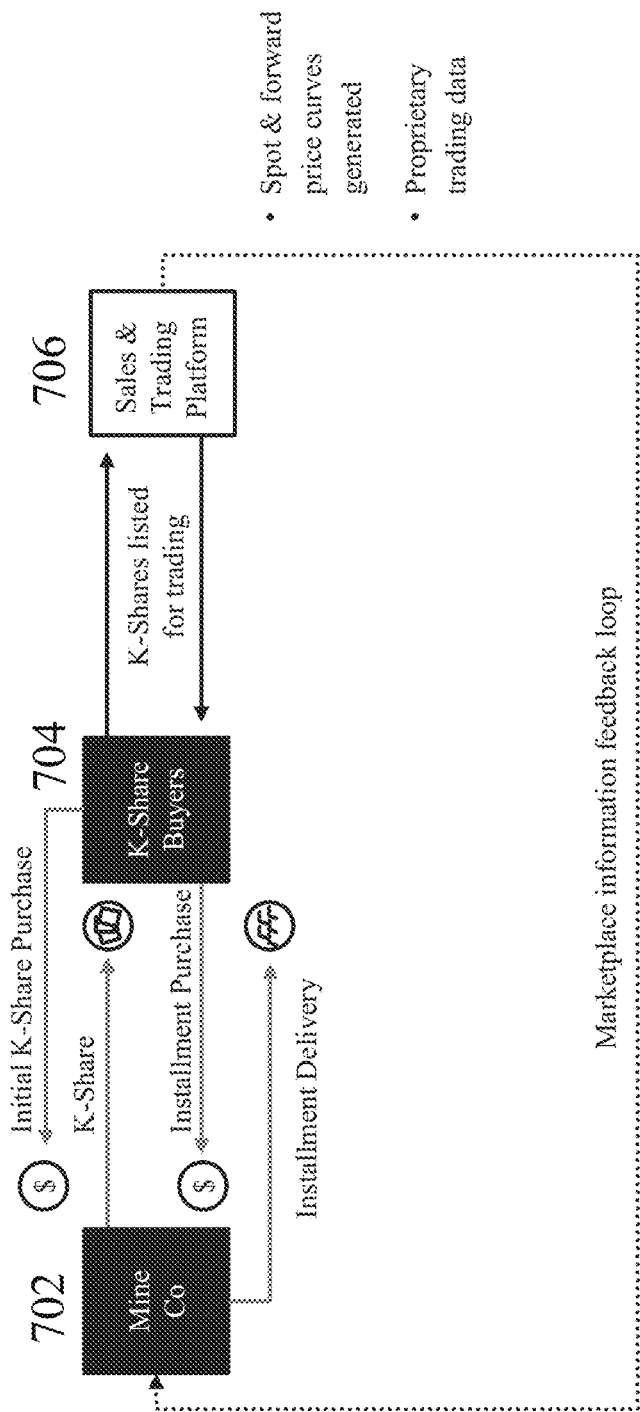
FIG. 7 illustrates a K-share marketplace, in accordance with an embodiment.

FIG. 7 illustrates a K-share marketplace 700, in accordance with an embodiment. Marketplace 700 includes a producer, such as mining company 702, buyers, such as K-share buyers 704, and sales and trading platform 706. It can be seen here that the single K-share instrument may be bought and sold without necessarily taking ownership of the underlying physical product, because K-shares can be resold before a given installment date or maturity date. The proprietary data for both transactions—instrument trading and asset purchase—can be aggregated by the platform and relayed to the participant interface, creating a feedback loop to mining company 702 and other mining companies on marketplace demand for its K-share offerings.

In the first example presented in FIG. 3, the initial purchase of a K-share for $100 is a data point that communicates the price at which a buyer is willing to secure the rights to future product. That instrument purchase price, then, at least encapsulates some relation of the current price of the underlying asset to the expected price of that asset at a given date in the future, expectations of movements in the underlying product price with respect to the installment purchase price, and some measure of a risk-free rate of return plus some measure of risk in delivery of the underlying product. The instrument purchase price is part of the market information available to determine prices, transaction volumes, interest rates, risk premiums, quantities available for purchase, and other such market data.

In the example presented in FIG. 4, the initial purchase of a K-share for $300 is a data point that communicates the price at which a buyer is willing to secure a production share for a definite time. In addition to relating market information about the respective pricing of the underlying asset, it encapsulates the value of having a series of multiple option dates embedded within a single instrument.

In accordance with an embodiment, the central service layer can be configured to translate this market information into cohesive price curves at points where transactions are consummated, thereby adjusting the market information to create an accurate, dynamic market price for the product, such as gold. This contrasts with conventional marketplaces that publish price information based on indications of intent, known as bids or asks, that are subject to false intent in the form of withdrawn offers to buy or sell.

Computer-system and communication network implementation is fundamental to creating, deriving, and displaying this market information to the benefit of the marketplace. To illustrate, a seller could meet a single buyer in person and offer to sell them 1 ounce of gold for a price of $10,000, to which the buyer agrees. That seller could make the offer for sale through the electronic platform to a broad marketplace of buyers and find that no one accepts until the price is lowered to $1,000. The market information as to the prevailing price from a manual transaction is $10,000 but is $1,000 from the computer-implemented system. The electronic platform is essential to achieving a fair and accurate price of the underlying product by publishing the aforementioned price information to marketplace participants. As one skilled in the relevant art will appreciate, determining adjustments to the market information (i.e., translating the market information into adjusted market information), as well as other approaches for transmitting this market information and adjusted market information to marketplace participants, are contemplated within the scope of this disclosure, as described throughout.

Further, say an instrument for physical product is sold from a mine in Canada while at the same time another instrument is sold for product from a mine in Chile with the same purchase and delivery terms. The prices of these instruments—offered simultaneously and enabled by the electronic platform—could be compared and made available to the marketplace, offering new market information on perceived country risk, geological risk, and so on, which cannot be duplicated in a manual contractual sale.

(iv) GUARANTEE AGREEMENT: G-SHARES

Since K-shares are a promise made by the mining company to deliver product at a future date, there is risk that the mining company will not perform. This risk of performance (or specifically, lack of performance, or underperformance) by the mining company can be reduced to the buyer by providing for a guarantee of delivery.

In accordance with an embodiment, any holder of physical product can provide them to the mining company, the electronic platform, or to a third party to serve as a guarantee of delivery of the K-share instrument and receive a fee for such use. The fee gives the holder of physical product, such as gold, an avenue by which they can earn a return on their holdings which would otherwise sit idly and face storage and opportunity costs. This arrangement can incentivize new demand for gold, not only drawing idle gold holdings into productive use, but also drawing cash holdings into play whereby the cash is used to make purchases of physical gold to stand for delivery.

In accordance with an embodiment, the guarantee agreement is provided in the form of G-shares. By introducing the guarantee instrument, the risk of delivery of physical product by a mining company is removed from a K-share buyers' profile altogether and instead transferred to a guarantor or pool of guarantors. In accordance with an embodiment, upon entering the terms of a K-share offering into the electronic platform, the issuing mining company 702 could indicate that they desire for the offering to be secured. This secured offer would be routed through the central service layer where a parallel G-share offering to match the K-share offering would be generated and offered through the participant interface.

Figure 5:
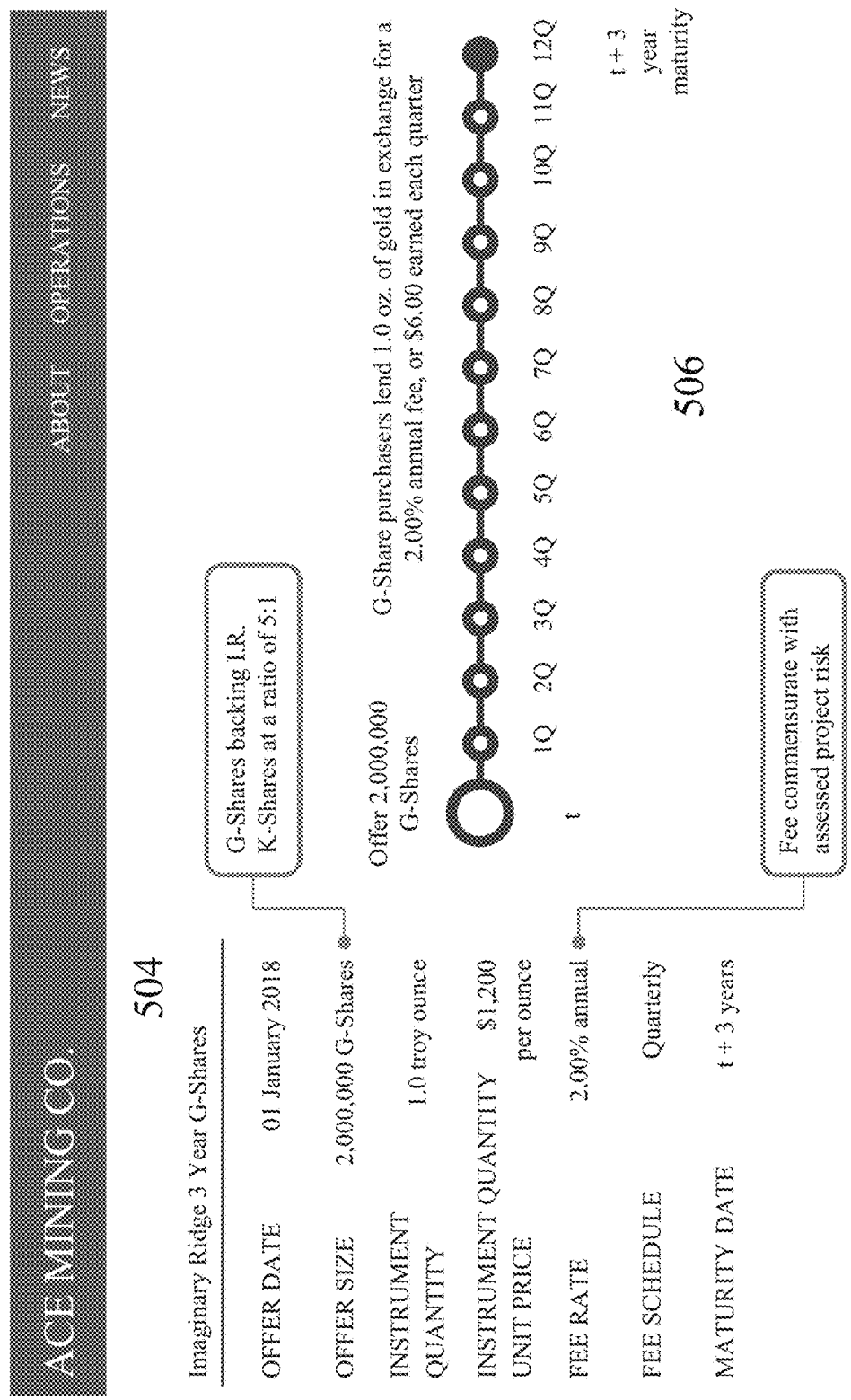
FIG. 5 is an additional view of the platform interface, in accordance with an embodiment.

FIG. 5 is an additional view of platform interface 200, in accordance with an embodiment. In this view, the terms of a G-share offering by exemplary mining company 202 are detailed, in accordance with an embodiment. In the case of the exemplary G-share offering depicted as 504, the offering is for a 3-year G-share, although one skilled in the art will appreciate that the terms of any particular offering may vary. In the event there is a failure to deliver the specified quantity of product under a K-share, the quantity of product under a corresponding G-share would be used to fulfill the K-share on the performance date. In one embodiment, upon failure to deliver on a given K-share installment date, the central service layer would be configured to notify the guarantor of the failure, and transfer of the physical metal to the K-share holder would be enacted.

The exemplary G-share offering 504 has terms that are depicted graphically in timeline 506. A G-share offering includes, in accordance with an embodiment, at least the following terms:

Offering Quantity: The number of G-shares offered. In exemplary G-share offering 504, two million G-shares have been offered to secure the K-shares.

Instrument Quantity: The amount of product pledged per G-share. In the exemplary G-share offering 504, one ounce of gold must be provided in guarantee. One skilled in the relevant art will appreciate that the quantity of the G-share need not match the quantity of the K-share it is securing. For example, a $\frac{1}{10}^{th}$ ounce G-share could partially secure a 1-ounce K-share with the remaining space being secured by other G-shares or remaining unsecured. One skilled in the relevant art will appreciate that the product used for this guarantee may be provided to any number of entities for safekeeping, and the procedure is specified by the G-share offering.

Instrument Quantity Unit Price: The initial per-unit price of the product pledged for the instrument. In accordance with an embodiment, the purchaser pays the instrument quantity unit price in cash and the proceeds are used to purchase physical product to stand as guarantee. In accordance with an embodiment, the instrument unit quantity price could be could paid in any fiat currency, paid in-kind, or paid in any other object of value, with the specification made as a measure of that object, for example a determined mass or volume. In accordance with embodiments, the instrument quantity unit price can be determined by the mining company, the proprietary marketplace, a third party, or by algorithm.

Fee rate: The fee paid to the G-share holder. In accordance with an embodiment, the fee is described as a percentage of the value of the instrument or underlying asset. One skilled in the relevant art will appreciate that other fee rates or valuations may be used, including absolute values, fee payment values at issuance or at maturity, fee payment values calculated using continuous or discrete rates, and the rate may or may not correspond directly with the perceived project risk and costs of borrowing or storage of the underlying asset. In various embodiments, the rate is paid in installments in accordance with a fee schedule or a single lump sum. In accordance with an embodiment, the fee rate could be could paid in any fiat currency, paid in-kind, or paid in any other object of value, with the specification made as a measure of that object, for example a determined mass or volume. In accordance with embodiments, the initial fee rate can be determined by the mining company, the proprietary marketplace, a third party, or by algorithm.

Maturity Date: The date at which the instrument matures in full, specified as either a date when all fee dates have passed or when a specified trigger condition (e.g., mineral resources subject to the instrument have been exhausted) has been met or where a failure to deliver has occurred under the corresponding K-share. In accordance with an embodiment, other provisions may cause the contract to expire prior to its stated maturity date. Upon successful fulfillment of the corresponding K-share by the producer, the underlying quantity of product is returned to the G-share holder, in accordance with an embodiment.

One skilled in the relevant art will appreciate that while these are the basic terms needed to create a fully-scoped G-share, other terms or variations of these terms may be used in order to provide a similarly complete offering. For example, terms could be provided as to the delivery point for the product or which party pays for refining, recasting, storage, insurance, security, and other costs of holding physical product.

In the case of gold, one skilled in the relevant art would appreciate that the gold used for guarantee could be allocated or unallocated in different embodiments. Further, gold submitted for use in guarantee could be recast into an identifiable and verifiable form, with a physical pattern injected, fresh serial numbers created, any other characteristic information recorded by the electronic platform, in accordance with an embodiment.

As timeline 506 illustrates, in exemplary G-share offering 504 the G-share purchasers each pledge 1 ounce of gold per share in exchange for a 2.00% annual fee, which translates to an expected $6.00 fee earned each quarter for three years (twelve quarters in total) with an initial instrument quantity unit price of $1,200 per ounce.

Figure 8:
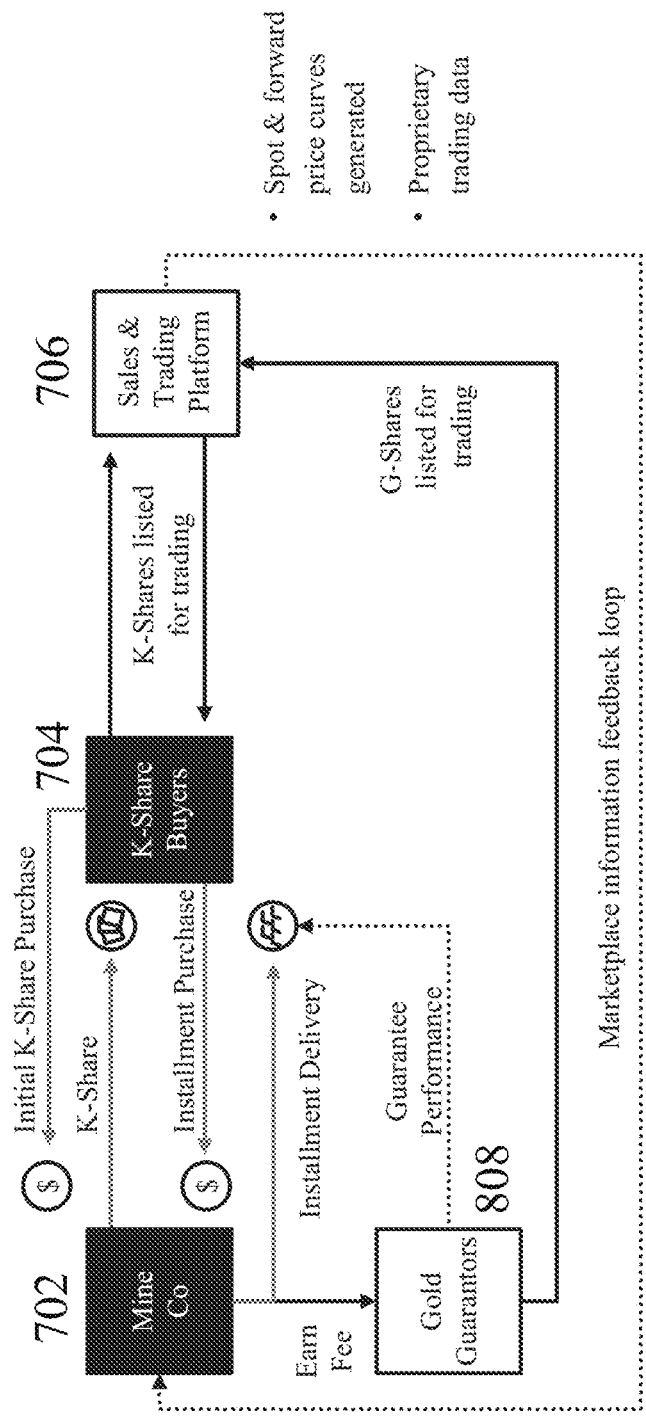
FIG. 8 illustrates a K-share and G-share marketplace, which additionally includes gold guarantors, in accordance with an embodiment

FIG. 8 illustrates a K-share and G-share marketplace 800, which additionally includes gold guarantors 808. In accordance with an embodiment, the G-shares issuance, registration, and trading protocol follows that of the K-shares instruments on the electronic platform, with the central service layer being configured to relay all information regarding terms, transactions, and holdings. In accordance with an embodiment, G-shares are made available for sale in the secondary market, with holders making the terms of offering available to other buyers in the marketplace where they are free to accept or ignore it.

As with K-shares, the terms of the guarantee instrument are completely flexible and can be arranged in many permutations. The issuing party can iterate the terms until the desired guarantee amount of product is obtained by sufficient acceptances of G-shares. In accordance various embodiments, the guarantee fee and instrument quantity unit price of the G-share at any given time could be indicated by the selling party at their discretion, it could be disclosed in the form of an economic feasibility study or prospectus filings, it could be assessed by a third party, it could be derived formulaically by the selling party or a third party, or could be derived formulaically by the central service layer and as coordinated by electronic platform.

In an embodiment, the central service layer could be configured to associate the individual identifier key from a K-share with a unique individual identifier key of a G-share by means of a unique family identifier key, which could also relate to the physical pattern in the unit of product standing for guarantee. Should the mining company successfully produce the unit, the individual K-share identifier key would be dissociated from the G-share and associated to the new unit of production and its internal physical pattern and other physical characteristics.

In an embodiment, several projects with K-shares issued could be pooled for a single G-share offering. By way of non-limiting example, 100,000 ounces from Project A are sold in a K-share offering and 100,000 ounces from Project B are sold in a separate K-share offering. A single G-share offering is then made for 200,0000 ounces to guarantee both projects. In accordance with an embodiment, one company could pool its portfolio of projects into a single K-share offering, potentially reducing the risk of delivery on the K-share. In the case where there is a G-share issued as a guarantee for this offering, the reduced risk could be reflected in a reduced fee rate.

In one non-limiting example, there could be a mismatch between the guarantee ounces and the underlying K-share ounces, with guarantee ounces being either greater than or lesser than the K-share ounces. In another non-limiting example, there could be a required provision that the guarantee ounces be at least matched on a one-for-one basis so there is no fractional pledge or rehypothecation where one ounce of guarantee gold is pledged to secure multiple K-shares.

Returning to FIG. 11, chart 1100 can be used to illustrate the effect of issuing more G-shares than K-shares in a ratio such that the risk of loss in the event a mining company fails to achieve production offered through K-shares is de minimis for any individual counterparty holding a G-share. At the same time, delivery risk is removed entirely from the corresponding K-share, meaning both instruments achieve a de minimis risk profile, potentially satisfying regulatory requirements. This could reduce administrative costs for mining companies and open access to a broader audience of buyers.

The central service layer could also be configured to fulfill the initial G-share offer by relaying a signal to a cash reserve account of the amount of physical product needed to be purchased from market sources to fully guarantee a K-share offering, in accordance with an embodiment. This cash reserve account could belong to the issuing mining company, the electronic platform, or a third party. There could also be a pool of reserves of the physical product held by a custodian, and the central service layer could automatically send a signal to the custodian to assign a given quantity of physical holdings to fill the G-share order, in one embodiment. This embodiment can reduce administrative expenses by reducing the need to validate submitted gold by process of re-assay. The data accounting for stocks of physical bullion being held in reserve for G-shares, withdrawals, deposits within the custodial network operating on the electronic platform can all be aggregated and relayed electronically by the central service layer, further enhancing the proprietary market information generated by the platform.

In accordance with an embodiment, upon exercise of an installment rendered under a K-share, the underlying physical metal purchased could automatically be converted to a G-share pledge. In an embodiment, gold pledged in a given G-share could be automatically pledged to a new K-share upon maturity and successful delivery of the initial K-share. In this manner, gold submitted to the platform could be held continuously for a duration not limited by the life of a given K-share.

As maturity approaches and the probability of the mining company being able to deliver on its obligations increases, the value of the G-share could be expected to reflect that decrease in risk. Trading of G-Shares in the proprietary marketplace, then, provides a mechanism for risk assessment and mining project feedback by marketplace participants in real time.

In accordance with an embodiment, the guarantee fee could be variable such that a mining company receives compensation in the form of reduced fee payments should they effectively reduce mining project risk. In the same manner as the trading of K-shares creates live, dynamic market information, trading of G-shares reflects real-time marketplace pricing of the underlying asset, some risk-free rate of return, some measure of mining company and project performance risk, time value to maturity, and other associated costs of holding and logistics such as handling, insurance, security, or storage fees. It can be seen that even if the risk of performance on the K-share goes to zero, the value of the G-share does not go to zero because there is an underlying physical asset. The selling of the G-share in the marketplace then still provides market information, including pricing information, on the underlying asset and the other variables.

In accordance with an embodiment, should a guarantor sell its G-share to another buyer in the proprietary marketplace, the underlying product (e.g., precious metal) represented by the G-share would transfer along with the G-share. In accordance with an additional embodiment, the guarantee fee is separated from the underlying product, such that the initial guarantor would retain ownership of the underlying product and just sell the right to receive the guarantee fee, on the condition that an equivalent amount of physical product or the equivalent value in cash is provided by the purchaser of the G-share. Should the cash value be submitted, the mining company, electronic platform, or a third party would purchase the physical product to stand as guarantee.

In an embodiment, accrued fees could be paid to the primary holder for time it held the G-share with the remainder of the rights to the guarantee fee being transferred to the purchaser. In another embodiment, the guarantee fee would be paid in-full on the date of maturity to the holder of the share at that time.

The implication of secondary G-share trading enabled by an electronic platform is that the pledge of physical product does not require a commitment to the full life of the associated K-share. A given G-share holder could pledge physical product for only a matter of seconds, provided that there is a buyer willing to purchase the G-share by making a pledge of equivalent physical product or its value in cash whereby the physical product would be purchased. These transactions whereby physical product is swapped further create new data on short-term lending rates based on a physical product, which is included in the market information made available to the benefit of the marketplace.

One skilled in the relevant art will appreciate that G-shares and K-shares may be held simultaneously in order to satisfy a certain risk profile. The owner of the K-share can also purchase a simultaneous position in G-shares, thereby taking on a measure of project risk. As compensation for taking on the risk, the buyer earns the guarantee fee. A person of ordinary skill in the art would therefore appreciate that a single buyer could hold more G-shares than it holds K-shares, it could match its holdings one-for-one, or it could own fewer G-shares than K-shares; the buyer is in total control of its risk due to the interplay of these two tradable instruments.

(V) CONTINGENCY SALE AGREEMENT: C-SHARES

Since the holder of each K-share has the right, but not obligation, to purchase the physical product in accordance with an embodiment, the company bears some risk that the physical product committed to the offering is not purchased by the K-share holder on a given installment date or maturity date. This risk can be reduced to the mining company by providing a series of contingency sales agreements with each K-share instrument.

In accordance with an embodiment, the contingency sales agreement is provided in the form of C-shares, whereby the holder has sequential rights to purchase the physical product should a precedent K-share holder elect to let an installment date lapse without purchase.

FIG. 6 is an additional view of platform interface 200, in accordance with an embodiment. In this view, the terms of a C-share offering by exemplary mining company 202 are detailed, in accordance with an embodiment. Exemplary C-share offering 604 is for a 3-year Level 1 C-share and has terms that are depicted graphically in timeline 606, although one skilled in the art will appreciate that the terms of any particular offering may vary.

A C-share offering includes, in accordance with an embodiment, contract terms that are similar to those of the priority K-share. As with the K-share that takes precedence to the C-share offering 604, the terms include the instrument quantity, purchase and delivery dates, installment price, maturity date, and instrument price. One skilled in the relevant art will appreciate that while these are the basic terms needed to create a fully-scoped C-share, other terms or variations of these terms may be used in order to provide a similarly complete offering. For example, the identity of the precedent K-share may be included, in accordance with an embodiment.

The C-shares issuance, registration, and trading protocol follows that of the other instruments on the electronic platform, in accordance with an embodiment. C-share offering 604 is depicted as a "Level 1" C-share. In accordance with an embodiment, C-shares are issued in a single level. In an alternative embodiment, C-shares are issued in multiple levels, with the level specifying the order of precedence among the C-shares and purchase rights being sequential.

C-shares aid mining companies in raising capital financing since they receive initial instrument purchase price with each level of C-shares. In current markets, the seller of an option collects a premium for selling the rights to purchase an asset on predetermined terms. C-shares enable mining companies to collect this premium themselves instead of intermediaries.

Figure 9:
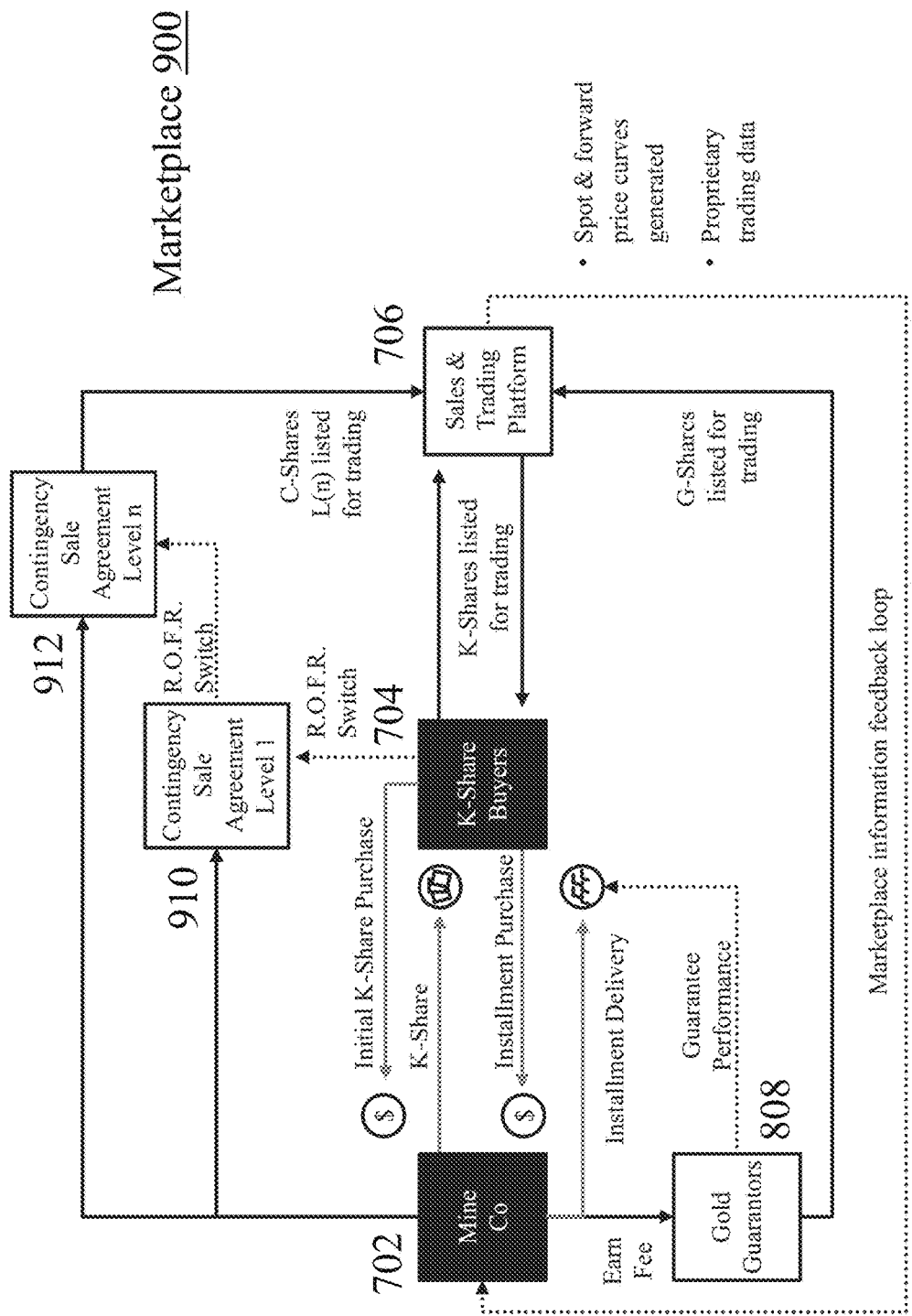
FIG. 9 illustrates a K-share, G-share, and C-share marketplace, in accordance with an embodiment.

FIG. 9 illustrates a K-share, G-share, and C-share marketplace 900, in accordance with an embodiment. Marketplace 900 includes the mining company 702, K-share buyers 704, and sales and trading platform 706 as previously illustrated in FIGS. 7 and 8 by way of non-limiting example, as well as gold guarantors 808 as previously illustrated in FIG. 8 by way of non-limiting example. Marketplace 900 additionally includes contingency sale agreement level 1 910 and contingency sale agreement level 'n' 912, each which result in the creation of C-shares offered for sale on platform 706, in accordance with an embodiment. Level 'n' C-shares take, in turn, after each level above has passed on its right of purchase to the installment.

In one embodiment, upon lapse of a precedent K-share installment, the central service layer would be configured to notify the holder of a next-priority C-share of its newly acquired priority rights. The party would then have the option to purchase on the C-share stated terms. Should they elect to let it lapse, the priority of purchase would be passed to the next level C-share owner, and so on.

In an embodiment, should sequential purchase rights be passed from a priority share to a subsequent level C-share, the G-share guaranteeing the priority share would pass in step to the subsequent share, with tracking of priority purchase rights enabled by the electronic platform.

In accordance with an embodiment, after initial sale, the C-shares will be available for secondary trading in the proprietary marketplace. The holder of a C-share can offer their share for sale in the same manner as the initial seller, setting the terms of the sale and making it available to buyers who are free to accept or ignore the offer, with the obligation to deliver retained by the initial seller.

In accordance with an embodiment, the central service layer is configured to associate a given C-share to a specific K-share by relating the individual identifier keys of each share by means of a family identifier key. In another embodiment, instead of relating one unique C-share to one unique K-share, the central service layer is configured to arrange a set of C-shares in line sequentially, with the first C-share in line having purchase rights to the first K-share that lapses from a pooled offering.

By way of non-limiting example, a C-share could be offered at a lower initial instrument price, with a lower ongoing installment price, or some combination of these or other term adjustments that make their purchase palatable to buyers. A mining company could determine that its cost of production plus some profit expectation would serve as a natural limit to its offerings. Alternatively, the C-shares could be offered at higher prices than K-shares. Or, the selling company could offer a higher K-price knowing it will simultaneously offer C-shares at lower prices. The selling company could continue to offer these shares until the offers are no longer accepted. In this manner, C-shares capture the entire spectrum of willingness to transact in the marketplace at any given moment in time, effectively indicating the price floor and price ceiling for the offered product, such as precious metals.

Existing market mechanisms measure price ranges by publishing market information on bids (intent to buy) and asks (intent to sell), even if there are no consummated transactions. By layering C-shares with K-shares, the range of market pricing is determined solely by consummated instrument purchases and product purchases. Thus, in accordance with an embodiment, the electronic platform that is configured for only offers for sale and acceptances of terms in both K-shares and C-shares is inherently immune to the type of price manipulation whereby bid and ask orders are submitted and canceled or withdrawn prior to transacting.

It could be foreseen that if the prevailing market price of gold has dropped below the predetermined installment price of the K-share, the value of that K-share would naturally decay as the installment date or maturity date approaches. However, at the same time, the value of a subsequent C-share would increase, at least where the C-share installment price remains lower than the prevailing market price. Thus, as the value of the K-share decreases, the value of the C-share increases, providing a means for marketplace participants to manage price risk exposure using only long holding positions.

This is significant as it precludes the need for short selling which is a practice used in traditional markets to profit from declines in asset prices. A short sale is where a market participant borrows a share and sells it at the then-current market price. If the price of the underlying share declines, the short seller buys a share at the lower price, profiting the difference between the price at which they initially sold and the price at which they buy. This means the profit is theoretically limited by the zero bound. If the price of the underlying increases, however, the seller must purchase the share at a higher price, meaning their losses are potentially unlimited. The introduction of short selling into a marketplace then creates an asymmetric incentive since the gain on short positions is limited but the loss is potentially unlimited.

Due to the potential for unlimited loss, market brokers often require the short seller to maintain certain levels of cash funding in their accounts to prove their creditworthiness. The interplay of K-shares and C-shares stand in contrast as it eliminates the need for short selling, eliminates asymmetric incentives which may result in distortionary price discovery, and eliminates the need to maintain cash funding in an account.

One skilled in the relevant art will therefore recognize that in the same manner that G-shares and K-shares are interrelated such that the purchaser can control its project risk exposure, C-shares and K-shares are interrelated such that the purchaser can control its price risk exposure. The byproduct of creating C-shares alongside K-shares is that an individual buyer can take an effectively infinite combination of positions in the transaction by purchasing any combination of K-shares, C-shares, and G-shares, thereby managing risk exposures and expected returns at its own discretion, with total risk of loss inherently limited by the principal they commit to the instrument purchases.

(vi) INSTRUMENTS AS INFORMATION NODES

The following section illustrates the proprietary information (particularly, market information) effected from the relationships of the instruments and the corresponding implications for the marketplace. Any reference to "the marketplace" refers to the collective participants acting through the proprietary electronic platform described herein. It is also assumed that in this non-limiting example, all transactions are settled by means of physical metal delivery only.

When transacted in the exemplary computing environments described herein, the various instruments described herein serve as information nodes. These information nodes are able to communicate marketplace information to the various marketplace participants, as described below. For the purposes of this discussion, references to the various instruments will be understood by one skilled in the relevant art to also apply to a corresponding information node of the instrument.

The following family of instruments is used for illustration and assumed to be offered by a single company. Upon offering, the central service layer creates unique individual identifier keys for each instrument and the corresponding metadata for the underlying physical products. A family identifier key is also created which associates the instruments in a family relationship:

a future K-share with optional installment ("KF")
a C-share Level 1 with optional installment ("C1")
a C-share Level 2 with obligatory installment ("C2X")
a G-share ("G")

The first instrument to issue is a future K-share (KF). Terms of the instrument call for optional installment purchase for 1 troy ounce, with a single installment and maturity date one year from today. The K-share would be offered to buyers in the marketplace with known, predetermined terms of purchase, and buyers in the marketplace could accept or ignore those terms. This process could be iterated until acceptable terms are agreed to and one of the buyers purchases the K-share.

Terms of the future K-share (KF):
Instrument Size: 1 troy ounce
Installment Size: 1 troy ounce
Installment Option: Yes
Installment Purchase Price: $1,300
Installment Date: 1 year from today
Maturity Date: 1 year from today
K-share Price: $350

In this example, a buyer is willing to pay $350 for a K-share under these terms. This transaction generates valuable information. If we were to infer a spot gold price implied by this transaction, we would intuitively consider it to be the present value of the future installment price plus the initial price paid for the K-share. However, it would also be expected that when the buyer paid $350 for the future K-share they were paying some premium for the right to choose whether or not to purchase on the installment date and paid for the exclusive first right to make that choice. So, in order to derive the spot price for gold alone, that inherent premium must be subtracted from the initial share price. This can be expressed in the following equation:

$$AuS = PV(IP) + KF - TP \quad [1.1]$$

Where:
AuS=Spot price of 1 troy ounce of gold
PV(IP)=Present value of installment price as stated in the terms of the K-share
KF=Instrument price
TP=Total premium Of the four variables in the formula shown above, only the $350 instrument price (KF) is immediately apparent as a numerical value. As a next step, the present value of the installment price can itself be expressed in a formula. To calculate the present value of the installment price, that price would be discounted at a rate that considers the value of time plus some rate that reflects the perceived ability of the mining company to deliver the product:

$$PV(IP) = IP * [e^{-(rf+rp)*T}] \quad [1.2]$$

Where:
IP=Installment price as stated in the terms of the K-share
e=Mathematical constant representing natural base for continuous compounding
rf=Risk-free interest rate, reflecting time value
rp=Risk premium expressed as a rate, reflecting the probability of the mining company's ability to deliver on its obligation of 1 troy ounce
T=Time remaining until installment, in this case 1 year Equation 1.2 can be substituted in equation 1.1 and we can insert the numerical values where they are known:

$$AuS = PV(IP) + KF - TP$$

$$AuS = IP * [e^{-(rf+rp)*T}] + KF - TP$$

$$AuS = \$1,300 * [e^{-(rf+rp)*1}] + \$350 - TP \quad [1.1]$$

We can now see that the following information has been obtained from the marketplace transaction executed on the electronic platform:
K-share (KF) price is known and set by the marketplace=$350
Installment Price (IP) is known as set by the terms in the instrument=$1,300
Time to installment (T) is known as set by the terms in the instrument=1 year
Which leaves these variables yet remaining unknown:
Spot price of gold (AuS)
Risk-free interest rate (rf)
Risk premium rate (rp)
Total premium (TP)

To calculate the numerical values of these unknown variables, two types of C-shares and a G-share are needed. Because the instruments in a given family are related to one another using a family identifier key, the central service layer can be configured to gather the data from the actual transactions and through further calculations translate these prices into the inherent individual components.

First consider a C-share Level 1 (C1) with optional installment purchase. This C-share will be issued with the same installment purchase and delivery terms as the future K-share (KF), the only difference being that C1 has sequential secondary rights of purchase. This means that the holder of the C-share only gets to make an election on the purchase should the holder of the priority K-share elect not to purchase.

In this example, assume that a buyer in the marketplace purchases an offered C-share for $300 through the electronic platform.
Terms of the C-share Level 1 (C1):
Instrument Quantity: 1 troy ounce
Installment Size: 1 troy ounce
Installment Option: Yes
Installment Purchase Price: $1,300
Installment Date: 1 year from today
Maturity Date: 1 year from today
Level: 1, or sequential secondary rights to purchase
C-share Price: $300

The only difference in the future K-share and the C-share is in the priority of rights to purchase and the initial price of the share. Because all the other underlying terms of the shares are the same, it can be deduced that the difference between the marketplace price of the future K-share and the C-share is the premium willing to be paid to secure first rights on the option to purchase 1 troy ounce of gold on the predetermined terms.

This premium can be intuitively understood as a measure of perceived scarcity—it's the price a buyer is willing to pay today to be sure they can purchase physical gold at some date in the future. The greater the perceived scarcity, the greater the price of the K-share with first rights relative to the C-share with second rights. Therefore, we can call the difference in price between the K-share and the C-share Level 1 the scarcity premium:

$$SP = KF - C1$$

$$SP = \$350 - \$300$$

$$SP = \$50 \quad [1.3]$$

Where:
SP=Scarcity premium

This scarcity premium is a new piece of information created by the sale and trading of the instruments that is not currently measured in established precious metals trading markets. Existing markets attempt to derive a form of scarcity premium by measuring the difference between the spot prices and futures contracts prices. The market is said to be in contango if the futures price is higher than the spot price, or backwardation if the spot price is higher than the futures price. But those measures encompass several variables such as risk premiums, expectations of future price, and other obfuscating data, making the isolation of a single scarcity premium infeasible.

Further, these existing measures of contango or backwardation attempt to measure scarcity by comparing different points in time. The instruments set forth herein measure the scarcity by comparing prices of a family of related instruments with the same maturity date, making it a fundamentally different measure of scarcity.

In addition to the scarcity premium, there is another type of premium inherent in the K-share price: an option premium. This is the value placed on being able to choose whether to purchase, rather than being obliged to purchase. To calculate the numerical value of the option premium, another C-share is required.

Assume a C-share Level 2 (C2X) is issued with the same terms as the C-share Level 1 (C1) except that the C-share Level 2 has sequential third rights of purchase and that there is no option, but rather an obligation, to purchase on the installment date should the holders of the precedent K-share and C-share Level 1 allow the installments to lapse. This mandatory installment purchase also implies that no further C-shares (i.e., Level 3, Level 4, etc.) can be issued for this given K-share, effectively making the C-share Level 2 holder the buyer of last resort.

Terms of the C-share Level 2 (C2X):
Instrument Quantity: 1 troy ounce
Installment Size: 1 troy ounce
Installment Option: No
Installment Purchase Price: $1,300
Installment Date: 1 year from today
Maturity Date: 1 year from today
Level: 2, or sequential third rights to purchase
C-share Price: $225

Assume a buyer in the marketplace accepts the terms of the offering and pays $225 to purchase this C-share Level 2 (C2X). Because the holder of C-share Level 2 does not have an option to purchase, the difference in price between the C-share Level 1 and the C-share Level 2 can be understood to include the option premium that the holder of C-share Level 1 has paid to have the choice to purchase. The difference in price of the two C-shares also encompasses the scarcity premium, since C-share Level 2 holder has rights of purchase subordinate to Level 1. These two premiums are shown as a formula below:

$$C1-C2X=SP+OP \qquad [1.4]$$

Where:
SP=Scarcity premium
OP=Option premium

Assuming the scarcity premium between the top-level K-share and C-share Level 1 is the same as the scarcity premium between C-share Level 1 and C-share Level 2, equation 1.4 can be rearranged to solve for the option premium:

$$OP=C1-C2X-SP$$

$$OP=\$300-\$225-\$50$$

$$OP=\$25 \qquad [1.4]$$

Because a K-share and two varieties of C-shares have been offered and accepted in the marketplace through the electronic platform, we now have numerical values for both the scarcity premium and option premium and can calculate the total premium embedded in the price of the priority K-share. Because the K-share is two steps ahead of the C-share Level 2, and we assumed that the scarcity premium between the levels is the same, the scarcity premium is doubled, as reflected in equation 1.5:

$$TP=(2*SP)+OP$$

$$TP=(2*\$50)+\$25$$

$$TP=\$125 \qquad [1.5]$$

Intuitively, the total price difference between the K-share and the C-share Level 2 should equal the Total Premium. Because the C-share Level 2 holder is last in sequence, and because they have the obligation to buy should all priority holders pass, the payment they make initially to acquire the share is for the opportunity to be the buyer of last resort:

$$\text{Check:} KF-C2X=TP=\$125$$

$$\$350-\$225=\$125=\$125$$

If we don't assume that the scarcity premium between levels is the same, we can still say with certainty the value of the total premium is $125. With the total premium now priced by the marketplace, we can return to equation 1.1 with the new information:

$$AuS=PV(IP)+KF-TP$$

$$AuS=IP*[e\hat{\,}-(rf+rp)*T]+KF-TP$$

$$AuS=\$1,300*[e\hat{\,}-(rf+rp)*1]+\$350-\$125 \qquad [1.1]$$

Having calculated the total premium, the only remaining unknown variables from equation 1.1 are:
Spot price of gold (AuS)
Risk-free interest rate (rf)
Risk premium rate (rp)

To solve for these variables, a G-share is needed. Assume a G-share (G) is issued at the same time as the future K-share and an individual identifier key is created and associated to the family identifier key. In this example, the G-share represents 1 troy ounce of existing physical gold pledged by a participant in the marketplace to guarantee the availability of 1 troy ounce of gold on the future K-share (KF) installment date. The issuer of the G-share will offer a price for the pledged ounce of gold as part of the terms, which can be accepted or ignored by participants in the marketplace. As an alternative to pledging physical product, the guarantor could pay the cash equivalent of the unit price, which the mining company, electronic platform, or third party would use to purchase the physical product to stand as a guarantee.

The G-share terms also describe the fee rate to be paid as compensation for the pledge of gold. This fee rate would represent some measure of the perceived risk of the G-share holder receiving the pledged gold at maturity, which is directly correlated to the mining company's ability to produce the product committed in the K-share sale. The fee rate would also encompass a risk-free rate of return. The terms could additionally state a rate of cost for handling, transport, insurance, security, and storage of the physical gold.

In this example, the terms of the G-share will assert that the guarantee fee will be paid in one payment one year from today, aligned with the maturity of the future K-share and C-shares. The offered fee rate can be adjusted until a marketplace participant will agree and pledge their gold and in return be issued the G-share, which the bearer could either trade in the proprietary marketplace or hold until maturity.

Terms of the G-share (G):
Instrument Quantity: 1 troy ounce
Instrument Quantity Unit Price: $1,500 per ounce
Fee Rate: 8.000% Annually, includes both risk-free rate and risk premium
Fee Schedule: Annual
Maturity Date: 1 year from today The price of the G-share can be understood as the present value of the underlying gold plus the present value of the net fee which the guarantor will receive at maturity in 1-year time should the mining company successfully deliver on the associated K-share. The implied G-share price can be calculated since all G-share terms are stated in the agreement.

There are two critical pieces of information gleaned from the G-share transaction. First, we know from the stated terms of the G-share that the total fee rate of 8.000% accounts for the both the risk-free rate (rf) and the risk premium (rp). Because the G-share stands as guarantee of delivery of the product committed to the K-share, the G-share has now borne the full risk of the mining company's ability to deliver. That means the risk premium borne by the K-share (KF) is zero.

This has momentous implications: The K-share has become a risk-free option on the purchase of physical gold directly from the producer.

With this knowledge, we can return to equation 1.1 and insert zero for the risk premium rate:

$$AuS=PV(IP)+KF-TP$$

$$AuS=IP*[e^\wedge-(rf+rp)*T]+KF-TP$$

$$AuS=\$1,300*[e^\wedge-(rf+0)*1]+\$350-\$125 \quad [1.1]$$

The second critical piece of information from the G-share transaction is in regard to the gold price. Since the terms state the unit price for one ounce of gold, we can insert it into equation 1.1 as the spot price (AuS):

$$AuS=PV(IP)+KF-TP$$

$$AuS=IP*[e^\wedge-(rf+rp)*T]+KF-TP$$

$$\$1,500=\$1,300*[e^\wedge-(rf+0)*1]+\$350-\$125 \quad [1.1]$$

This leaves only one unknown variable remaining in equation 1.1, which can be rearranged to solve for the risk-free interest rate (rf):

$$rf=-\ln[(AuS-(KF-TP))/IP]/T$$

$$rf=-\ln[(\$1,500-(\$350-\$125))/\$1,300]/1$$

$$rf=1.942\% \quad [1.1]$$

With the risk-free rate of return now defined, we can return to the terms of the G-share and solve for the risk premium the market has inherently priced into the purchase of the G-share. Since the G-share guarantee fee is a discrete annual payment, the 1.942% continuously compounded risk-free interest rate is converted to a discrete rate of 1.961% used in equation 1.6 below:

$$rt=rp+rf$$

$$rp=rt-rf$$

$$rp=8.000\%-1.961\%$$

$$rp=6.039\% \quad [1.6]$$

In this example, when the holder of the physical ounce accepted the terms of the G-share with an 8.000% fee rate, they inherently priced a risk premium of 6.039% into the G-share. If the participants in the marketplace did not believe this appropriately priced the risk, they could ignore the offered fee rate of 8.000%. The mining company could have then revised the terms of the G-share raising the rate to, say, 10.000%. If this had been accepted, then the calculations could be run again to derive the new risk premium embedded within the G-share.

In summary, here is the information generated by the marketplace transactions:
1-year Future K-share (KF): $350
1-year C-share Level 1 (C1): $300
1-year C-share Level 2 (C2X): $225
1-year G-share (G): $1,500 per ounce with 8.000% fee rate And here is the inherent component information derived from the interrelated transactions of those instruments (referred to collectively as "market information"):
Spot price for physical gold=$1,500
Discrete risk-free interest rate=1.961%
Price of risk on company's ability to deliver=6.039%
Premium for perceived scarcity of physical gold=$50
Premium for option value to elect a purchase in the future=$25

In this manner, the relationship of K-shares, C-shares, and G-shares as associated by the individual and family identifiers and maintained by the central service layer creates information which could not be derived if any of the instrument types did not exist or if they were issued and transacted in isolation.

This is a simple, static example without changing variables and has assumed primary sales from seller to initial participants in order to illustrate how information from a transaction is parsed into components. One skilled in the art can imagine these instruments being subsequently transacted in a dynamic marketplace and that there could be many offerings being made from a plurality of companies simultaneously. The central service layer could then be configured to incorporate the inherent component information from each family of shares being transacted into an aggregate and be displayed to the marketplace in real-time. For example, the central service layer could be configured to perform a weight averaging function to aggregate the market information. This function could occur for instruments within a family, or aggregating information from multiple families, in accordance with various embodiments:

$$AGP=[(Price_1*Volume_1)+(Price_n*Volume_n)]/(Sum\ Volume_{1,n}) \quad [1.7]$$

Where: AGP=Aggregate Gold Price

In order to continuously translate the market information from prices of the instruments as they transact on the electronic platform, the central service layer could be programmed with a series of logic statements that translate price changes of the instruments into adjusted market information.

Take an example where a G-share is traded on the secondary market at an increased price to the implied instrument price at initial issuance. The central service layer could be configured to match the G-share to its associated K-share and C-shares by recalling the unique identifier key of the family of shares. If there is no corresponding increase in the price of the associated K-share and C-shares in the secondary market, then the increase in the price of the G-share could be attributed to a decrease in perceived project risk by the marketplace. If there is, however, a corresponding increase in the price of the associated K-share and C-shares, then a portion of the G-share price increase could be attributed to an increase in the underlying gold price. The changes within a family can also be compared to changes between different families of shares to translate the market information. The central service layer can be programmed with these if-then logic statements such that changes in the price of the instruments can instantaneously translate the market information, incorporate it into the aggregate, and display it as a live-feed to the benefit of the marketplace.

To further illustrate the usefulness of the proprietary market information as derived from transactions of these instrument families, say there was a major geopolitical event in mining jurisdiction. The central service layer can relate the geographic location of the event to all outstanding K-shares with metadata related to that location and map their associated G-shares and C-shares by means of the family identifier key. In this way the price changes in each family of instruments immediately following an event could then be specifically related to the event. In existing markets, the relationship of current events to price changes must be inferred through speculation. In the system presented herein, the price impacts of current events can be calculated, not speculated.

It is worth emphasizing that the marketplace prices the instruments, not formulas. Marketplace pricing of the instruments creates proprietary market information. Formulas are used to interpret that market information and it is the relationship of the three share types, as recorded and maintained by the central service layer using individual and family identifier keys, that allow this information to be translated and incorporated into the aggregate and adjusted market information.

Because the marketplace determines pricing, there could be deviations in the marketplace prices for various instruments from what the formulas indicate the prices of those instruments should be. This is expected and is precisely the behavior of a healthy marketplace, as those dislocations provide the economic incentive to transact the instruments.

It should be noted that the formulas presented have been simplified to include only the minimum variables required to illustrate the derivation of pricing information or other market information. One skilled in the art will appreciate that other market information, such as the risk-free interest rate, could be aggregated in a similar fashion, or aggregated using other methods. Or, for example, there could be other costs included in the handling, transport, insurance, security, or storage cost of gold which may be accounted for in some calculations. Or, the C-shares could be offered with varying installment prices. Or, the K-shares could be of multiple installments, each installment either having an option or an obligation, the length of option period could vary within an instrument where there is a series of installments, each installment with a different installment purchase price, or each installment either a percent interest in production or an absolute volume, or various points of delivery for the physical product specified. These approaches to determining market information are provided by way of non-limiting example, and one skilled in the relevant art will appreciate there may be several other variations of terms, or non-consummated offers to sell or requests to purchase as well as consummated transactions, in accordance with various embodiments.

One skilled in the art can appreciate all these variations would alter the formulas. However, each of those permutations would only further emphasize the power of having these instruments trade in concert in a proprietary marketplace enabled by the electronic platform. The specific pricing of each component in every permutation could be derived and aggregated, creating market information which is a fair representation of the marketplace in a far more detailed and transparent manner than exists in any traditional equity, options, futures, or spot markets or any other markets of the like.

(vii) INFORMATION MARKETPLACE: TRADE AND PRICING DATA

The foregoing examples demonstrate the power of having families of K-shares, C-shares, and G-shares trade concurrently on an electronic platform which manages both initial listings and secondary trading through a central service layer that maintains the relation of shares to one another and to the associated product metadata by means of identifier keys. Having distinct instruments shifts sources of risk into different pools, allowing those sources of risk to be priced individually thereby creating new market information which can be displayed to the benefit of the marketplace participants.

Further, one skilled in the relevant art will appreciate that these instruments need not be limited to precious metals, but could be used for any other units of production, say, soft commodities such as cotton, corn, and wheat. In accordance with an embodiment, K-shares and C-shares could be used to sell these soft commodities, with the units of production being guaranteed by units of precious metals in the form of G-shares substantiated by gold. The G-share fee rates for each of these commodities could be displayed to the marketplace and an aggregate benchmark risk-free rate could be derived. This use case for G-shares correspondingly increases demand for gold, expanding its utility from an idle store of value into productive asset standing as guarantee to produce many of the world's fundamental goods.

The significance of live, dynamic pricing of risk-free interest rates derived from an asset such as physical gold traded through these instruments on the electronic platform cannot be overstated. LIBOR has been described as the world's most important number, with tens of trillions of dollars of financial instruments globally hinging on even its tiniest movements. Currently, banks self-report their lending rates, which are aggregated into an average lending rate—a practice which has proven prone to manipulation. In contrast, the trading of share families allows benchmark interest rates to be derived in a transparent way that doesn't rely on honesty in self-reporting as LIBOR does.

In addition to using the market information to appropriately price its sales offerings and raise desired capital financing on equitable terms, mining companies can use the market information to adjust production schedules, production rates, mine plans, and other operational issues of the like. In another example, where a set of buyers is concentrated in a particular geography, or comprise a particular type of buyer (e.g., pension funds, hedge funds, etc.) the mining company could choose to allocate greater resources to advertising its products in that particular geography or to that buyer type.

From the buyers' perspective, there is not currently a means of differentiating the contractual terms of purchasing one unit of gold from any other unit of gold. With these instruments, the buyer can view market information on new mine supply, expected delivery of that supply, price of that supply, and the price of risk associated with fulfilling that supply.

Since mining companies have the freedom to offer their product at prices of their sole discretion, competitive pricing is enacted between mining companies—each company is now competing to supply its product at prices in which their offers get accepted. There is also competition created within a mining company, in that sales of product from individual mines and mine projects are competing for the best terms of sale. These instruments are then a tool to provide immediate market-based feedback to mining companies on how to allocate capital and manage their portfolios. In this manner, these instruments could be better indicators of asset value than traditional valuation metrics such as internal rate of return since K-shares, G-shares, and C-shares provide live, dynamic asset pricing in real time.

New mine supply from mining company 702 is also competing with existing gold stock which is being recirculated in bullion markets, futures markets, and the like. The introduction of these instruments means that not only are miners competing on the supply side, but these markets are enacted to compete with each other. These instruments could be used by end-market manufacturers in industries such as jewelry, automotive, aerospace, semiconductors or other technologies, to secure a supply of raw material input on predetermined terms, thereby protecting their supply chain and securing their cost base. These instruments enable competition between forms of financing as well, such as debt and equity, potentially improving the terms in those agreements for the mining companies.

Live market pricing for risk on a project-by-project basis or a company-by-company basis could also be aggregated into an individual company risk premium. In another embodiment, this could be measured by tracking the company's rate of successful deliveries on K-shares. This company risk premium, or credibility rating, could aid traditional equity markets by providing an objective measurement of a company's operations. Currently, investors rely on subjective assessments published by equity analysts, with these reports often inducing increased buying and selling of company shares upon their release. A system of assessment grounded in objective data such as successful deliveries of K-shares could preclude reliance on subjective reports. The credibility rating could also come into play with G-share offerings, as companies with higher ratings could obtain lower G-share fee rates, lowering their cost of financing.

The electronic platform can also serve to facilitate bilateral transactions for physical metals, whereby a seller makes an offer for sale available only to another single counterparty rather than a broad marketplace of buyers, in accordance with an embodiment. By conducting these bilateral transactions through the electronic platform, the data can be aggregated with data of primary sales and secondary instrument trading to portray a comprehensive view of the proprietary market information. This also reduces time and cost burdens of bilateral agreements, with no need to report trade data to another system or regulatory body as a separate step from executing the agreement, as is the proposed solution to this gap in data in current markets.

In accordance with an embodiment, shares on the electronic platform are sold in multiple fiat currencies. In current markets, gold is almost exclusively sold in US Dollar terms. However, mining companies pay operating costs in local currencies where they produce the gold. This limitation creates inherent risk of margin compression due to fiat currency movements. The tradable sales instruments described herein give mining companies a means to hedge their fiat currency exposure by selling units of production in the same currency as it bears operating costs. The mining company can also make a judgement about the currency risk it will bear in any given share offering and adjust its per-unit price of sale in accordance with the perceived risk.

In an embodiment, end-market manufacturers that purchase K-shares to secure raw material input could also use shares sold in multiple fiat currencies to hedge their production costs. One skilled in the relevant art will appreciate that any manufacturer of any good that has production costs, say, a shoe manufacturer, could purchase precious metals shares on the electronic platform as a fiat currency hedge.

Foreign exchange rates could be derived by comparing the price of one instrument—or the implied price of the underlying physical gold—to the price of an instrument in a different fiat currency. In an embodiment, the central service layer could be configured to derive these rates by algorithm as coordinated by the electronic platform. These foreign exchange rates could then be aggregated by the central service player and relayed to all market participants, further enhancing the market information and its usefulness to the marketplace. One skilled in the relevant art will appreciate that these instruments could serve purely as vehicles for currency trading, arbitraging, and hedging, providing an alternative to current market mechanisms where trillions of dollars' worth of foreign exchange rate derivatives are traded each day.

These instruments provide market information with geographic and government implications as well. Pricing of the K-shares, G-shares, and C-shares can provide a proxy of political risk for various jurisdictions which can be used by marketplace participants to make capital allocation decisions. Governments could also use this information to attract foreign investment through improved regulatory regimes, tax environments, and other such factors under their control. As they adjust their sovereign policies, the corresponding price of risk could be reflected in the pricing of these instruments.

(vii) COMPUTER SYSTEM IMPLEMENTATION

In an embodiment, instruments 1006 serve as nodes by which information, such as proprietary market information, is transmitted between buyers and sellers on platform 1000. A proprietary marketplace 1008 is configured to be accessible by a participant interface 1010. Participant interface 1010 sends orders through a central service layer 1012 of marketplace 1008. Central service layer 1012 facilitates all interactions between a seller and a buyer. The central service layer 1012 also coordinates other necessary services, such as a sales and trading platform 1014, including share issuance and registration through an instrument registrar 1016, fulfillment of installment orders through an installment fulfillment service 1018, clearing of secondary trading orders by a transaction clearing party 1020, transfer recording and other data storage at backend servers 1022, custodial services for physical product, and other such services required by and related to the commercial sale of physical commodities and trading of instruments that are conducted on the platform, in accordance with embodiments. The central service layer is configured to manage the transmission of proprietary data created by each of these functions.

In accordance with an embodiment, primary issuance of the instruments and secondary trading are conducted in a single marketplace facilitated by electronic platform 1000. In another embodiment, primary issuance and secondary trading are conducted in separate marketplaces. In another embodiment, the electronic platform provides some of these services while contracting with third parties to provide others.

One of ordinary skill in the art can appreciate that in various embodiments, buyers could submit requests to purchase before an offer to sell is made, that there could be many offers to sell and requests to purchase open simultaneously, that offerings could be made in many forms, such as various auction formats, and other such transaction formats.

In accordance with an embodiment, the computer system is configured to execute algorithms to calculate current interest rates, current spot prices of various metal products, future prices of various metal products, option prices on metal products, and other market information, as derived from marketplace activity. The use of unique identifier keys condenses the raw information used in these algorithms, reducing the computing resources required and accelerating the calculation time of translating this market information. With thousands, or even millions, of transactions handled daily by the electronics platform, gathering the data and performing the algorithms to provide near-instantaneous information to marketplace participants could not be done by the human mind. Network communication would also be required for the aggregation, transmission, and display of this proprietary market information such as prices, transaction volumes, interest rates, risk premiums, quantities available for purchase, and other such market data.

Computer system implementation enables the coordination and administration of physical product sales through the tradable sales instruments. The computer system keeps records of physical product produced by mines under contract, keeps records of contracts with mines, associates internal physical pattern data with other metadata such as date, name of mine, individual and family identifier keys, weight, purity and other pertinent information, keeps records on physical product that has been recast, and keeps records on physical product that has left the platform, in accordance with an embodiment.

The computer system provides essential functions such as providing templates of instrument sales, providing completed templates of instruments that are issued, keeping records on potential buyers who register on the platform, comparing buyer identification records with applicable know your party legal requirements, trading with enemy act type of legislation, trading sanction legislation and any other party prohibitive legislation. It keeps records of physical holdings of marketplace participants and compares records of interest holdings against de minimis requirements of local legislation to ensure that such investment limits are not exceeded by any buyer.

The communication interface or network interface would be required for the electronic platform to serve functions such as communication of offers to potential buyers, communication to buyers and holders of platform products of payment due dates, delivery dates, delivery places, delivery methods, defaults, interest earned, rollovers, maturity dates, and other such action items. Manual administration of these functions would be uneconomic and infeasible. One skilled in the art can appreciate that the above examples are not exhaustive and provided by means of non-limiting example.

Figure 12:
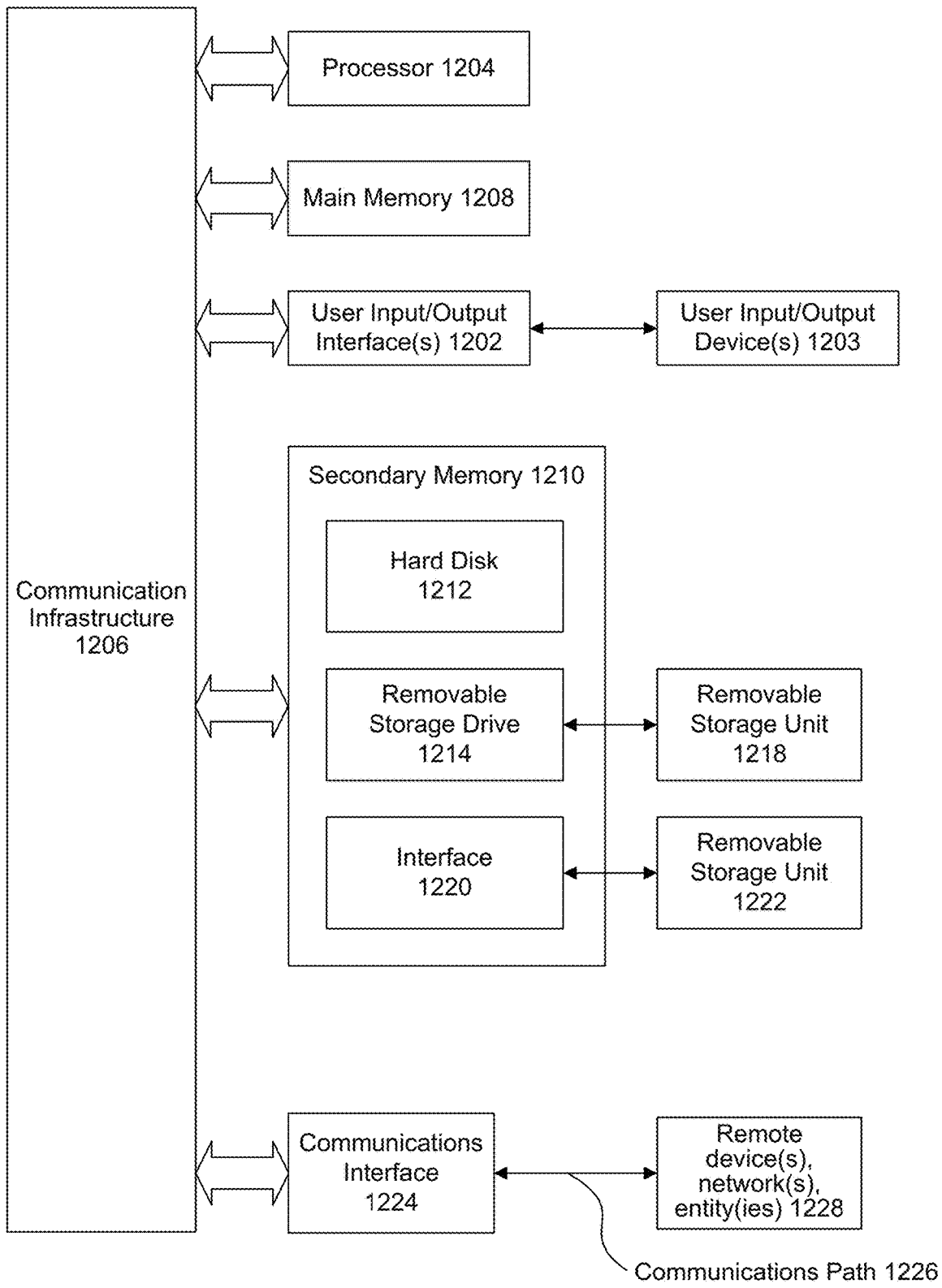
FIG. 12 is an example computer system useful for implementing various embodiments.

Various embodiments may be implemented, for example, using one or more well-known computer systems, such as computer system 1200 shown in FIG. 12. One or more computer systems 1200 may be used, for example, to implement any of the embodiments discussed herein, as well as combinations and sub-combinations thereof.

Computer system 1200 may include one or more processors (also called central processing units, or CPUs), such as a processor 1204. Processor 1204 may be connected to a communication infrastructure or bus 1206.

Computer system 1200 may also include user input/output device(s) 1203, such as monitors, keyboards, pointing devices, etc., which may communicate with communication infrastructure 1206 through user input/output interface(s) 1202.

One or more of processors 1204 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc. One or more of processors 1204 may also be optimized for processing blockchain computations, including the case of using a GPU for blockchain computations, in order to provide computationally efficient maintenance of a blockchain ledger, as disclosed above.

Computer system 1200 may also include a main or primary memory 1208, such as random access memory (RAM). Main memory 1208 may include one or more levels of cache. Main memory 1208 may have stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 may include a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 may read from and/or write to removable storage unit 1218.

Secondary memory 1210 may include other means, devices, components, instrumentalities or other approaches for allowing computer programs and/or other instructions and/or data to be accessed by computer system 1200. Such means, devices, components, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 may enable computer system 1200 to communicate and interact with any combination of external devices, external networks, external entities, etc. (individually and collectively referenced by reference number 1228). For example, communication interface 1224 may allow computer system 1200 to communicate with external or remote devices 1228 over communications path 1226, which may be wired and/or wireless (or a combination thereof), and which may include any combination of LANs, WANs, the Internet, etc. Control logic and/or data may be transmitted to and from computer system 1200 via communication path 1226. Computer system 1200 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1200 may be a client or server, accessing or hosting any applications (or "apps") and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

(ix) CONCLUSION

The foregoing detailed description provides an entire reconstruction of the way marketable physical gold is formed and transacted. It comprises a series of instruments which can provide:
a spot price for gold based on a physical market;
various futures prices for any number of dates based on delivery of physical gold and not cash settlement;
measurement of marketplace perception of risk for mining projects, mining companies, and mining jurisdictions;
a risk-free interest rate and lending rates based on physical gold;
a fixed income instrument for a definite time; and,
currency trading and risk management instruments;

Making physical metal available for purchase to buyers in the marketplace through this series of instruments allows for the implementation of features such as:
an ownership interest in a stream or finite quantity of production;
a series of embedded exercisable options;
a continuum of purchase and delivery dates;
risk transfer and dissemination; and,
contingent purchase rights.

All these features contribute to the creation of thoroughly robust market information that benefits the marketplace. Given the physical basis for the instruments being a manufactured form of physical metal with an internal physical pattern for identification, there is an inherent prohibition on the creation of derivative financial instruments.

The instruments can serve mining companies in at least the following ways:
to secure most favorable pricing for the commercial sale of their production in controlled tranches;
to increase efficiency in securing capital financing;
to manage price risk exposures;
to mark-to-market the value of assets with a true marketplace price;
to diminish commercial risk by acquiring customers and settling deliveries physically;
to secure financing for operating costs;
to provide marketplace-based feedback on project viability;
to utilize as currency for compensation in asset acquisitions; and
to manage its capital base, including repayment of debt and returning capital to equity shareholders.

Due to the interaction of the instruments, the marketplace does not require:
short selling;
margin maintenance requirements;
submissions of intents to purchase prior to an offer for sale;
the separation of a spot marketplace from a futures marketplace from a bilateral trading marketplace; or,
specific common option maturity dates, but rather a continuum.

All the benefits described, and other ramifications not explicitly noted herein, can be enhanced by designing a marketplace environment within the electronic platform which would prohibit or provide disincentives for detrimental market practices such as predatory high frequency trading, front-running, wash trading, and spoofing.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary embodiments, but should be defined only in accordance with the following claims and their equivalents.

What is claimed is:

1. A method, comprising:
   communicating information, by a computing device, between a seller and a buyer of a first instrument that represents a production share of verifiable physical goods, the communicating being over a central service layer of the computing device, wherein the central service layer is configured to facilitate transactions of a plurality of first instruments, and wherein the first instrument is recorded in a data store with the plurality of first instruments;
   recording, by the computing device, a second instrument in the data store, wherein the second instrument represents second physical goods corresponding to the verifiable physical goods, the second physical goods being pledged by a guarantor in communication with the central service layer;
   associating, by the computing device, the second instrument recorded in the data store with the first instrument using an identifier that refers to both the first and second instruments to form a family relationship between the first instrument and the second instrument, wherein the family relationship establishes that an amount of the second physical goods of the second instrument covers an amount of the physical goods of the production share of the first instrument;
   executing a purchase by the buyer of the first instrument from the seller with the central service layer; and
   providing ownership records of the first instrument and verifiable physical goods corresponding to the first instrument, the ownership records being for any number of transfers of the first instrument occurring over the central service layer;
   wherein the first instrument represents a specific unit of precious metal, the method further comprising:
   forming the unit of precious metal and, during formation of the unit of precious metal, injecting a substance into the precious metal while the precious metal is in liquid form to form a unique physical pattern of shapes that remains within the unit of precious metal, and
   recording the unique physical pattern in association with the first instrument so that the specific unit of precious metal represented by the first instrument is verifiable.

2. The method of claim 1, wherein the first instrument specifies terms for purchase of the verifiable physical goods from a source by the buyer; the method further comprising providing a third instrument associated with the identifier and in the family relationship with corresponding first and second instruments, the third instrument representing a contingency right to purchase the production share represented by the corresponding first instrument in event of non-purchase by the buyer holding the corresponding first instrument.

3. The method of claim 2, wherein the verifiable physical goods comprise precious metals and the source comprises a precious metals mine.

4. The method of claim 1, wherein the first instrument references a specific physical good of the verifiable physical goods, the method further comprising marking the specific physical good, when produced, with the identifier.

5. The method of claim 1, wherein the identifier is fixed on a specific physical good corresponding to one of the instruments.

6. The method of claim 1, further comprising:
   translating, by the computing device, market information regarding the production share from the first instrument and the second instrument based on the family relationship and accessed from the data store using the identifier, wherein the market information regarding the production share is determined at least in part based on the existence of the family relationship between the first instrument and the second instrument; and
   integrating the market information regarding the production share into adjusted market information.

7. The method of claim 6, further comprising:
   transmitting, by the computing device, the market information regarding the production share and the adjusted market information to devices connected over the central service layer.

8. A system, comprising:
   a memory; and
   one or more processors, coupled to the memory, configured to perform operations comprising:
   communicating information between a seller and a buyer of a first instrument that represents a production share of verifiable physical goods over a central service layer, the verifiable physical goods comprising a unit of precious metal, wherein the central service layer is configured to facilitate transactions of a plurality of first instruments, and wherein the first instrument is recorded in a data store with the plurality of first instruments;
   after creation of the first instrument by the system, having a connection to another system that is forming the unit of precious metal and, during formation of the unit of precious metal, is injecting a substance into the precious metal while the precious metal is in liquid form to form a unique physical pattern of shapes that remains within the unit of precious metal, the unique physical pattern being received by the system;
   recording the unique physical pattern in association with the first instrument so that the specific unit of precious metal represented by the first instrument is verifiable;
   recording a second instrument in the data store, wherein the second instrument represents second physical goods corresponding to the verifiable physical goods, the second physical goods being pledged by a guarantor in communication with the central service layer;
   associating the second instrument recorded in the data store with the first instrument using an identifier that refers to both the first and second instruments to form a family relationship between the first instrument and the second instrument, wherein the family relationship establishes that an amount of the second physical goods of the second instrument covers an amount of the physical goods of the production share of the first instrument;

executing a purchase by the buyer of the first instrument from the seller with the central service layer; and providing ownership records of the first instrument and verifiable physical goods corresponding to the first instrument, the ownership records being for any number of transfers of the first instrument occurring over the central service layer.

9. The system of claim 8, wherein the first instrument specifies terms for purchase of the verifiable physical goods from a source by the buyer; the operations further comprising providing a third instrument associated with the identifier and in the family relationship with corresponding first and second instruments, the third instrument representing a contingency right to purchase the production share represented by the corresponding first instrument in event of non-purchase by the buyer holding the corresponding first instrument.

10. The system of claim 9, wherein the source comprises a precious metals mine.

11. The system of claim 8, wherein the first instrument references a specific physical good of the verifiable physical goods, and wherein the specific physical good is associated with the identifier.

12. The system of claim 8, wherein the identifier is fixed on a specific physical good corresponding to one of the instruments.

13. The system of claim 8, wherein the one or more processors, coupled to the memory, are further configured to perform:

translating market information regarding the production share from the first instrument and the second instrument based on the family relationship and accessed from the data store using the identifier, wherein the market information regarding the production share is determined at least in part based on the existence of the family relationship between the first instrument and the second instrument; and integrating the market information regarding the production share into adjusted market information.

14. The system of claim 8, the operations further comprising:

tracking market information of the verifiable physical goods by logging, by the central service layer, a transaction of a specific physical good of the verifiable physical goods.

15. A computer-readable storage device having instructions stored thereon, execution of which, by a computing device, causes the computing device to perform operations comprising:

communicating information between a seller and a buyer of a first instrument that represents a production share of verifiable physical goods, the communicating being over a central service layer of the computing device, the verifiable physical goods comprising a unit of precious metal, wherein the central service layer is configured to facilitate transactions of a plurality of first instruments, and wherein the first instrument is recorded in a data store with the plurality of first instruments;

after creation of the first instrument in the data store, providing a connection to a system that is forming the unit of precious metal and, during formation of the unit of precious metal, is injecting a substance into the precious metal while the precious metal is in liquid form to form a unique physical pattern of shapes that remains within the unit of precious metal, the unique physical pattern being received by the computing device;

recording the unique physical pattern in association with the first instrument so that the specific unit of precious metal represented by the first instrument is verifiable;

recording a second instrument in the data store, wherein the second instrument represents second physical goods corresponding to the verifiable physical goods, the second physical goods being pledged by a guarantor in communication with the central service layer;

associating the second instrument recorded in the data store with the first instrument using an identifier that refers to both the first and second instruments to form a family relationship between the first instrument and the second instrument, wherein the family relationship establishes that an amount of the second physical goods of the second instrument covers an amount of the physical goods of the production share of the first instrument;

translating market information regarding the production share from the relationship between the first instrument and the second instrument accessed from the data store using the identifier and integrating the market information regarding the production share into adjusted market information, the identifier condensing an amount of raw information used in translating the market information; and transmitting the market information regarding the production share and the adjusted market information to devices connected over the central service layer.

16. The computer-readable storage device of claim 15, wherein the first instrument specifies terms for purchase of the verifiable physical goods from a source by the buyer; the operations further comprising providing a third instrument associated with the identifier and in the family relationship with corresponding first and second instruments, the third instrument representing a contingency right to purchase the production share represented by the corresponding first instrument in event of non-purchase by the buyer holding the corresponding first instrument.

17. The computer-readable storage device of claim 16, wherein the source comprises a precious metals mine.

18. The computer-readable storage device of claim 16, wherein the translating comprises:

analyzing the market information regarding the first instrument and the second instrument together with market information regarding the third instrument on the production share to determine the adjusted market information for the physical good associated with the production share, wherein the first instrument, the second instrument, and the third instrument are traded within a marketplace over the central service layer.

19. The computer-readable storage device of claim 15, wherein the first instrument references a specific physical good of the verifiable physical goods, and wherein the specific physical good is marked with the identifier.

20. The computer-readable storage device of claim 15, wherein the identifier is fixed on a specific physical good corresponding to one of the instruments.

21. The computer-readable storage device of claim 15, the operations further comprising:

tracking market information of the verifiable physical goods by logging, by the central service layer, a transaction of a specific physical good of the verifiable physical goods based on a unique identifier of the specific physical good that makes the specific physical good verifiable.

* * * * *